US008570398B2

(12) United States Patent
Nakase et al.

(10) Patent No.: US 8,570,398 B2
(45) Date of Patent: Oct. 29, 2013

(54) IMAGE PROCESSING APPARATUS THAT RECORDS IMAGE FILES IN A FOLDER BASED ON A SET CONDITION AND SHOOTING MODE

(75) Inventors: Yuichi Nakase, Tokyo (JP); Nobukazu Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 13/280,247

(22) Filed: Oct. 24, 2011

(65) Prior Publication Data

US 2012/0038792 A1 Feb. 16, 2012

Related U.S. Application Data

(63) Continuation of application No. 11/483,555, filed on Jul. 11, 2006.

(30) Foreign Application Priority Data

Jul. 13, 2005 (JP) .................................. 2005204739
Jul. 13, 2005 (JP) .................................. 2005204742
Jul. 13, 2005 (JP) .................................. 2005204743

(51) Int. Cl.
*H04N 5/76* (2006.01)

(52) U.S. Cl.
USPC ..................................... 348/231.1; 348/231.2

(58) Field of Classification Search
USPC ........................................... 348/231.1, 231.2
See application file for complete search history.

(56) References Cited

U.S. PATENT DOCUMENTS

| 7,409,411 | B2 | 8/2008 | Sato |
| 2003/0011683 | A1 | 1/2003 | Yamasaki et al. |
| 2003/0088557 | A1 | 5/2003 | Morino |
| 2004/0117411 | A1 | 6/2004 | Ueda et al. |
| 2004/0148453 | A1 * | 7/2004 | Watanabe et al. ................. 711/1 |
| 2006/0173918 | A1 | 8/2006 | Nakase et al. |
| 2006/0259512 | A1 | 11/2006 | Jinno et al. |

FOREIGN PATENT DOCUMENTS

| CN | 1577331 A | 2/2005 |
| JP | 6078260 A | 3/1994 |
| JP | 7302230 A | 11/1995 |
| JP | 2000201309 A | 7/2000 |
| JP | 2001054041 A | 2/2001 |
| JP | 2001078135 A | 3/2001 |
| JP | 2001094927 A | 4/2001 |

(Continued)

OTHER PUBLICATIONS

Taiwanese Office Action dated Apr. 16, 2010 in corresponding Taiwanese Application No. 95125486.

(Continued)

*Primary Examiner* — Joel Fosselman
(74) *Attorney, Agent, or Firm* — Fitzpatrick, Cella, Harper & Scinto

(57) ABSTRACT

In an image processing apparatus which can store a pickuped image file in a new folder, the user's convenience is improved, and the creation of unnecessary folders is suppressed. If a preset condition for the creation of a new folder is satisfied, a new folder is created when a next shooting instruction is issued (S125). Creating a new folder when a shooting is actually performed prevents the creation of an empty folder. In addition, since a folder creation condition can be set in advance, there is no need to execute a sequence of creating a folder for every shooting.

11 Claims, 24 Drawing Sheets

(56) References Cited

FOREIGN PATENT DOCUMENTS

| | | |
|---|---|---|
| JP | 2002-142185 | 5/2002 |
| JP | 2002-238011 | 8/2002 |
| JP | 2003037805 A | 2/2003 |
| JP | 2003162709 A | 6/2003 |
| JP | 2003209725 A | 7/2003 |
| JP | 2003333470 A | 11/2003 |
| JP | 2004056814 A | 2/2004 |
| JP | 2004096582 A | 3/2004 |
| JP | 2004171587 A | 6/2004 |
| JP | 2004304619 A | 10/2004 |
| JP | 2005051453 A | 2/2005 |
| JP | 2005123849 A | 5/2005 |
| JP | 2005-175957 | 6/2005 |
| WO | 2005034126 A1 | 4/2005 |

OTHER PUBLICATIONS

European Search Report dated Feb. 23, 2010 in corresponding European Application No. 06117073.4.

Japanese Office Action dated Dec. 18, 2009 in corresponding Japanese Application No. 2005-204742.

European Search Report dated Nov. 20, 2009 in corresponding European Application No. 06117073.4.

Chinese Office Action dated Nov. 7, 2008 in corresponding Chinese Application No. 200610105849, and English language translation thereof.

* cited by examiner

F I G. 21
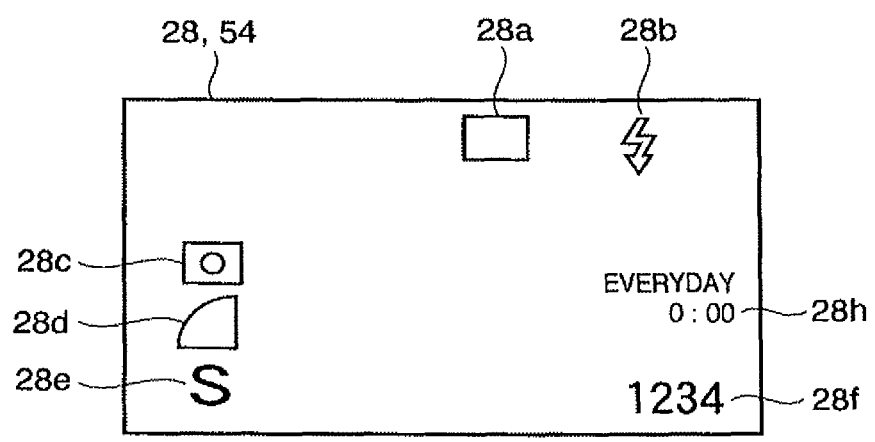

F I G. 22
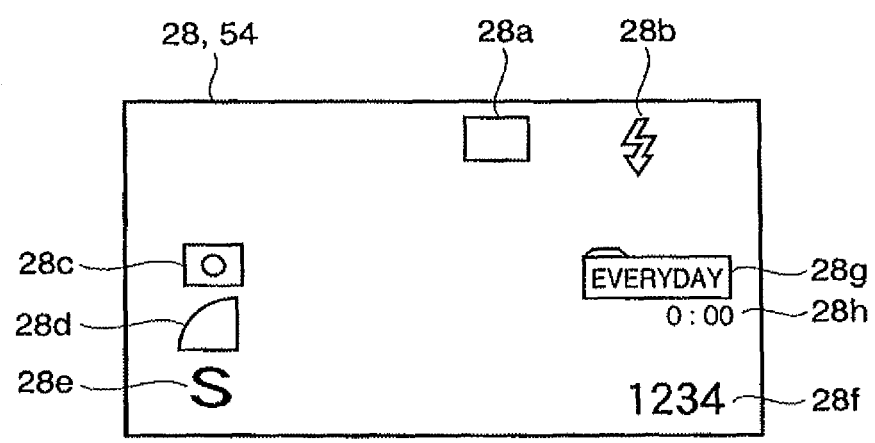

IMAGE PROCESSING APPARATUS THAT RECORDS IMAGE FILES IN A FOLDER BASED ON A SET CONDITION AND SHOOTING MODE

This application is a continuation of application Ser. No. 11/483,555, filed Jul. 11, 2006, the contents of which are incorporated by reference herein.

BACKGROUND OF THE INVENTION

1. Field of the Invention

The present invention relates to an image processing apparatus which pickups and records still and moving images and a control method therefor.

2. Description of the Related Art

Conventionally, image processing apparatuses, which pickups still and moving images by using an image pickup device such as a CCD sensor or CMOS sensor as represented by digital cameras or digital video cameras have been widely used. In such an image processing apparatus, pickuped images are recorded as digital data files (pickuped image files).

In general, pickuped image files are recorded using a file system (folder structure) using folders (directories). There has been proposed a technique of classifying pickuped image files by using folders at the time of recording operation so as to facilitate search and the like afterwards. Japanese Patent Laid-Open No. 2003-333470 discloses a technique of allowing a user to select a recording destination folder for a pickuped image file from existing folders in a recording medium or to create a new folder and designate the new folder as a recording designation.

In this conventional technique, however, when a new folder is to be set as a recording destination for a pickuped image file, the user needs to create a new folder before a shooting and designate the new folder as a recording destination. In addition, if a new folder is created and set as a recording destination and the recording destination is changed before an actual shooting, an empty, unnecessary folder is left. Such an empty folder becomes a search target when a search is made for an image in the recording medium to, for example, play back the image, and hence becomes a cause for an increase in search processing time. In addition, this folder becomes a hindrance when the user searches for a desired image, and hence also becomes a cause for deterioration in operability.

According to the above conventional technique, when a new folder is to be set as a recording destination, the user creates a folder and designates a recording destination with respect to a recording medium currently loaded in the image processing apparatus. If, therefore, a new folder is created and designated as a recording destination, and the recording medium is replaced before a shooting, the empty folder is left in the removed recording medium. Furthermore, since the new folder designated as a recording destination does not exist in the newly loaded recording medium, a pickuped image file cannot be recorded in the desired folder.

In addition, conventionally, there has been available a digital still camera which includes a means for selecting a folder in which a pickuped image is to be stored and displays the selected folder so as to facilitate image search by classifying/organizing images at the time of a shooting (see, for example, Japanese Patent Laid-open No. 6-78260). Furthermore, there is available an image pickup apparatus including buttons which allow efficient directory creation and a display unit which displays directory information even if the apparatus has neither a large monitor unit nor a keyboard unit (see, for example, Japanese Patent Laid-Open No. 2000-201309).

Although these conventional techniques can display the information of created folders and directories, they cannot notify a user of a state wherein a new folder is to be created in conjunction with shooting operation. For this reason, even if a camera automatically changes the save destination for a pickuped image to a new folder or new directory, the user cannot know it, resulting in difficulty in performing image search processing or the like.

In addition, the above conventional techniques are not designed to display the state of a camera. Therefore, the user cannot know the timing at which the camera automatically creates a new folder or new directory. For this reason, it is difficult to change settings as needed and construct a desired folder structure or directory structure.

Further, as another example of a proposed technique of classifying pickuped image files so as to facilitate search and the like afterwards. Japanese Patent Laid-Open No. 2001-54041 discloses an image pickup apparatus which stores a pickuped image in a folder having a creation date which is the same as the shooting date, and creates a new folder if such a folder does not exist.

Saving a plurality of related images (sequenced images) obtained by, for example, continuous shooting in the same folder facilitates management. In addition, the user is likely to expect that such images will be saved in the same folder. However, since the image pickup apparatus disclosed in Japanese Patent Laid-Open No. 2001-54041 is based on the assumption that images are classified according to shooting dates even sequenced images are saved in different folders if they were pickuped on different dates.

SUMMARY OF THE INVENTION

The present invention has been made to solve such problems in the conventional techniques. More specifically, it is the first object of the present invention to improve user's convenience and suppress the creation of unnecessary folders in an image processing apparatus which can store a pickuped image file in a new folder.

It is the second object of the present invention to allow a user to know that a new folder is to be created at the time of a next shooting in an image processing apparatus which can store a pickuped image file in a new folder.

It is the third object of the present invention to achieve automatic classification of pickuped image files so as to more satisfy the user's intention in an image processing apparatus which can facilitate classification of pickuped image files by recording them by creating a new folder.

According to an aspect of the present invention, there is provided an image processing apparatus which records an image file obtained by a shooting in a folder in a recording medium, comprising: save destination determination unit adapted to determine a save destination folder for an image file will be obtained by a next shooting from an existing folder in the recording medium and a new folder which does not exist in the recording medium on the basis of a preset new folder creation condition; folder creation unit adapted to create a new folder in the recording medium when an instruction for the next shooting is issued and the save destination is the new folder; and recording unit adapted to record an image file obtained in response to the instruction for the next shooting in the save destination determined by the save destination determination unit.

According to another aspect of the present invention, there is provided a control method for an image processing apparatus which records an image file obtained by a shooting in a folder in a recording medium, comprising: a save destination determination step of determining a save destination folder for an Image file will be obtained by a next shooting from an existing folder in the recording medium and a new folder which does not exist in the recording medium on the basis of a preset new folder creation condition; a folder creation step of creating a new folder in the recording medium when an instruction for the next shooting is issued and the save destination is the new folder; and a recording step of recording an image file obtained in response to the instruction for the next shooting in the save destination determined in the save destination determination step.

With this arrangement, according to the present invention, in an image processing apparatus which can store a pickuped image file in a new folder, the user's convenience can be improved, and the creation of unnecessary folders can be suppressed.

According to a further aspect of the present invention, there is provided an image processing apparatus which records an image file obtained by a shooting in a folder in a recording medium, comprising: save destination determination unit adapted to determine a save destination folder for an image file will be obtained by a next shooting from an existing folder in the recording medium and a new folder which does not exist in the recording medium; and notification unit adapted to notify that the save destination folder is determined as a new folder, when the save destination folder is determined as the new folder.

According to yet further aspect of the present invention, there is provided a control method for an image processing apparatus which records an image file obtained by a shooting in a folder in a recording medium, comprising: a save destination determination step of determining a save destination folder for an image file will be obtained by a next shooting from an existing folder in the recording medium and a new folder which does not exist in the recording medium; and a notification step of notifying that the save destination folder is determined as a new folder, when the save destination folder is determined as the new folder.

In addition, with this arrangement according to the present invention, in an image processing apparatus which can store a pickuped image file in a new folder, a user can know that a new folder is to be created at the time of a next shooting.

According to still further aspect of the present invention, there is provided an image processing apparatus which records an image file obtained by a shooting in a folder in a recording medium, comprising: save destination determination unit adapted to determine that a save destination folder for an image file will be obtained by a next shooting is an existing folder in the recording medium when no preset change of date and time has occurred, and is a new folder which does not exist in the recording medium when the preset change of date and time has occurred; folder creation unit adapted to create a new folder in, the recording medium when an instruction for the next shooting is issued and the save destination is the new folder; and recording unit adapted to record an image file obtained in response to an instruction for the next shooting in a save destination folder determined by the save destination determination unit wherein when the preset change of date and time occurs during a sequenced image shooting, the save destination determination unit determines an existing folder in the recording medium as the save destination folder until the sequenced image shooting is complete.

According to another aspect of the present invention, there is provided a control method for an image processing appa-
ratus which records an image file obtained by a shooting in a folder in a recording medium, comprising: a save destination determination step of determining that a save destination folder for an image file will be obtained by a next shooting is an existing folder in the recording medium when no preset change of date and time has occurred, and is a new folder which does not exist in the recording medium when the preset change of date and time has occurred; a folder creation step of creating a new folder in the recording medium when an instruction for the next shooting is issued and the save destination is the new folder and a recording step of recording an image file obtained in response to an instruction for the next shooting in a save destination folder determined in the save destination determination step wherein when the preset change of date and time occurs during a sequenced image shooting, in the save destination determination step, an existing folder in the recording medium is determined as the save destination folder until the sequenced image shooting is complete.

With this arrangement, according to the present invention, automatic classification of pickuped image files can be achieved so as to more satisfy the user's intention in an image processing apparatus which can facilitate classification of pickuped image files by recording them by creating a new folder:

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 21 is a view showing an example of display performed by the digital camera according to the fourth embodiment of the present invention in setting display processing;

FIG. 22 is a view showing an example of display performed by the digital camera according to the fourth embodiment of the present invention in setting display processing;

DESCRIPTION OF THE EMBODIMENTS

Preferred embodiments of the present invention will now be described in detail in accordance with the accompanying drawings.

<<First Embodiment>>

Figure 1:
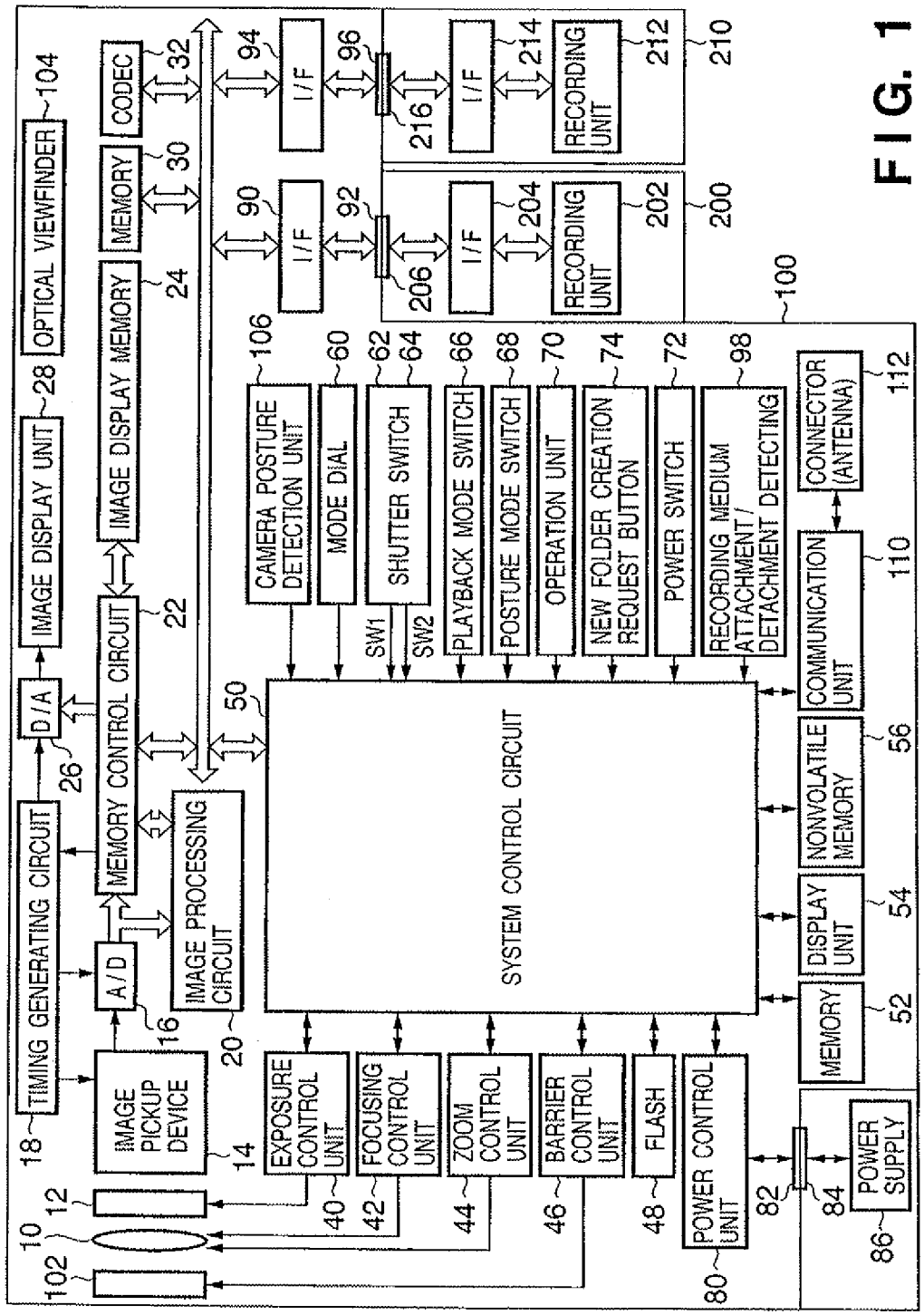
FIG. 1 is a block diagram showing an example of the arrangement of a digital camera as an example of an image processing apparatus according to an embodiment of the present invention.

FIG. 1 is a block diagram showing an example of the arrangement of a digital camera as an example of an image processing apparatus according to an embodiment of the present invention.

Reference numeral 10 denotes a photographing lens; 12, a shutter having a stop function; 14, an Image pickup device such as a CCD or CMOS sensor which converts an optical image into an electrical signal; and 16, an A/D converter which converts an analog signal output from the image pickup device 14 into a digital signal.

A timing generating circuit 18 supplies clock signals and control signals to the image pickup device 14, the A/D converter 16, and a D/A converter 26, and is controlled by a memory control circuit 22 and a system control circuit 50.

An image processing circuit 20 performs predetermined pixel interpolation processing and color conversion processing for data from the A/D converter 16 or data from the memory control circuit 22.

The image processing circuit 20 performs predetermined arithmetic processing by using pickuped image data. The system control circuit 50 controls an exposure control unit 40 and a focusing control unit 42 on the basis of the obtained arithmetic processing result. With this operation, AF (Auto Focus) processing, AE (Auto Exposure) processing, and EF (Electronic Flash pre-emission) processing of the TTL (Through The Lens) system are performed.

In addition, the image processing circuit 20 performs predetermined arithmetic processing by using pickuped image data, and performs AWB (Auto White Balance) processing of the TTL system on the basis of the obtained arithmetic processing result.

The memory control circuit 22 controls the A/D converter 16, the timing generating circuit 18, the image processing circuit 20, an image display memory 24, the D/A converter 26, a memory 30, and a codec 32.

Output data from the A/D converter 16 is written in the image display memory 24 or the memory 30 through the image processing circuit 20 and the memory control circuit 22 or is written in the image display memory 24 or the memory 30 through the memory control circuit 22.

Display image data written in the image display memory 24 is displayed on an image display unit 28 such as an LCD or organic EL display through the D/A converter 26. Sequentially displaying pickuped image data (through-the-lens images) on the image display unit 28 makes it possible to implement an electronic viewfinder (EVF) function.

The image display unit 28 can arbitrarily turn on/off display in accordance with an instruction from the system control circuit 50. When display is turned off, the power consumption of a digital camera 100 can be greatly reduced.

The memory 30 is a storage device which stores pickuped still and moving images, and has a storage capacity large enough to store a predetermined number of still images or a predetermined time period of moving images. For this reason, in the case of continuous shooting, in which a plurality of still images are continuously pickuped, or in the case of a panoramic shooting, it is possible to write a large number of images in the memory 30 at high speed.

Furthermore, it is possible to use the memory 30 as a work area of the system control circuit 50.

The codec 32 reads in image data from the memory 30, performs known data compression processing or decompression processing by using adaptive discrete cosine transform (ADCT), wavelet transformation, or the like, and writes the processed data in the memory 30.

The exposure control unit 40 controls the shutter 12 having the stop function and also has a flash brightness control function in conjunction with a flash 48.

The focusing control unit 42 controls focusing of the photographing lens 10. A zoom control unit 44 controls zooming of the photographing lens 10. A barrier control unit 46 controls the operation of a protection unit 102 serving as a lens barrier which protects the photographing lens 10.

The flash 48 has a function as an auxiliary light source at the time of a shooting, and a brightness control function. The flash 48 also has a function of emitting AF auxiliary light.

The exposure control unit 40 and the focusing control unit 42 are controlled by the TTL system. The system control circuit 50 controls the exposure control unit 40 and the focusing control unit 42 on the basis of the arithmetic processing result obtained by the image processing circuit 20.

The system control circuit 50 is, for example, a CPU, which controls the entire digital camera 100 by executing a program stored in a memory 52. The memory 52 stores constants, variables, programs, and the like for the operation of the system control circuit 50.

A display unit 54 comprises a combination of an LCD, an LED, a speaker, and the like, and outputs an operation state, a message, and the like using characters, images, sounds, and the like in accordance with the execution of a program by the system control circuit 50. One or a plurality of display units 54 are arranged at easily observable positions near an operation unit 70 of the digital camera 100. Part of the display unit 54 is placed in an optical viewfinder 104.

For example, the following are the display contents of the display unit 54: a single shot/continuous shooting mode indication, a self-timer indication, a compression ratio indication, an indication of the number of recording pixels, an indication of the number of recorded images, an indication of the number of remaining shootable images, a shutter speed indication, an aperture value indication, an exposure correction indication, a flash indication, a red-eye reduction indication, a macro shooting indication, a buzzer setting indication, a remaining timepiece battery level indication, a remaining battery level indication, an error indication, an information indication by a number composed of a plurality of digits, an indication of the attachment or detachment state of the recording media 200 and 210, an indication of the attachment or detachment state of the lens unit, a communication I/F operation indication, a date and time indication, an indication indicating the connected state with an external computer, an in-focus indication, a shooting preparation completion indication, a camera shake warning indication, a flash charge indication, and an indicating of recording medium write operation. Some of these indications are displayed in the optical viewfinder 104 as will be described later.

Among the display contents of the display unit 54, the display contents of the LED or the like include an in-focus indication, a shooting preparation completion indication, a camera shake warning indication, a flash charge indication, a flash charge completion indication, a recording medium write operation indication, a macro shooting setting notification indication, a secondary battery charged state indication, and the like.

Among the display contents of the display unit 54, the contents displayed by a lamp and the like include an indication by a self-timer notification lamp and the like. This self-timer notification lamp may be shared as AF auxiliary light.

A nonvolatile memory 56 is a memory that is electrically erasable/recordable, and an EEPROM or the like is used as the nonvolatile memory 56.

A mode dial 60, shutter switches 62 and 64, a playback mode switch 66, a posture mode switch 68, and the operation unit 70 constitute an operation means for inputting various operation instructions to the system control circuit 50. Each of these components is comprised of a button, a switch, a dial, a touch panel, a pointing device by line-of-sight detection, a voice recognition device, or the like or a combination thereof.

Each of these operation means will be described in detail below.

The mode dial 60 allows switching/setting of the following functional shooting modes, such as an automatic shooting mode, program shooting mode, shutter speed priority shooting mode, stop priority shooting mode, manual shooting mode, focal depth priority (depth) shooting mode, portrait shooting mode, landscape shooting mode, closeup shooting mode, sports shooting mode, nightscape shooting mode, and panoramic shooting mode.

The shutter switch SW1 62 is turned on midway (pressed halfway) along the operation of a shutter button (not shown) provided on the digital camera 100. This generates an instruction to start operation such as AF Auto Focus) processing, AE (Auto Exposure) processing, AWB (Auto White Balance) processing, EF (Electronic Flash pre-emission) processing, and the like.

The shutter switch SW2 64 is turned on when the shutter button (not shown) is completely operated (fully pressed). With this operation, a series of shooting and recording processing operations are started. That is, this operation starts exposure processing of writing a signal read from the image pickup device 14, as image data, in the memory 30 through the A/D converter 16 and the memory control circuit 22. This series of processing operations also include development processing using arithmetic processing in the image processing circuit 20 and the memory control circuit 22, and recording processing of reading the image data from the memory 30, compressing the data in the codec 32, and writing the image data in the recording medium 200 or 210.

The playback mode switch 66 allows setting of each of the following function modes: a playback mode multi-screen playback/erase mode, and PC connection mode.

The posture mode switch 68 is used to turn on/off a posture mode. The posture mode is a mode of recording, on a recording medium, the posture of the digital camera 100 detected by a camera posture detection unit 106 at the time of a shooting as auxiliary information (image posture flag) in a pickuped image file, and using the recorded data at the time of playback operation. More specifically, with this mode, control can be performed by referring to an image posture flag at the time of playback operation such that an image pickuped at a vertical position is automatically displayed at a vertical position, and an image pickuped at a horizontal position is automatically displayed at a horizontal position.

The operation unit 70 comprises various buttons, a touch panel, and the like. More specifically, for example, the operation unit 70 includes a menu button, a set button, a macro button, a multi-screen playback/new page button, a flash setting button, a single shot/continuous shooting/self-timer switching button, a menu movement+(plus) button, a menu movement−(minus) button, a playback image movement 4 plus) button, a playback image movement−(minus) button, a pickuped image quality selection button, an exposure correction button, a date and time setting button, a selection/switching button for selecting and switching various functions, a determination/execution button for determining and executing various functions, an image display ON/OFF switch for turning on/off the image display unit 28, a quick review ON/OFF switch for setting a quick review function of automatically playing back pickuped image data immediately after a shooting, and a compression mode switch for selecting a compression ratio for JPEG (Joint Photographic Expert Group) compression or selecting a CCDRAW mode of recording a signal from the image pickup device on a recording medium upon converting it into a digital signal.

In this embodiment, as JPEG compression modes, for example, a normal mode and a fine mode are prepared. The user of the digital camera 100 can perform a shooting by selecting the normal mode when importance is attached to the data size of a pickuped image, or by selecting the fine mode when importance is attached to the quality of a pickuped image.

In a JPEG compression mode, the codec 32 reads out image data written in the memory 30, compresses the data at a set compression ratio, and records the data on, for example, the recording medium 200.

In a RAW mode, image data is read out from the memory 30, which is directly read from the image pickup device 14 for each line in accordance with the pixel array of the color filter of the image pickup device 14 through the A/D converter 16 and the memory control circuit 22, and is recorded on the recording medium 200.

A power switch 72 is used to turn on or off the power supply.

A new folder creation request button 74 is used to make settings to create a new folder in the recording medium 200 or 210 at the time of a next shooting and record a pickuped image file in the created new folder.

A power control unit 80 comprises a battery detection circuit, a DC/DC converter, a switch circuit which switches blocks to be energized, and the like. The power control unit 80 detects the attachment/detachment of a battery, the type of battery, and a remaining battery level, and controls the DC/DC converter on the basis of the detection result and an instruction from the system control circuit 50, thereby applying a necessary voltage to each unit including a recording medium for a necessary period of time.

A power supply 86 comprises a primary battery, such as an alkaline battery or a lithium battery, a secondary battery such as a NiCd battery, a NiMH battery, or a Li battery, an AC adaptor, and the like, and is mounted in the digital camera 100 through connectors 82 and 84.

The recording media 200 and 210 such as a memory card and a hard disk respectively include recording units 202 and 212 comprising a semiconductor memory, a magnetic disk, and the like, interfaces 204 and 214 for the digital camera 100, and Connectors 206 and 216. The recording media 200 and 210 are loaded in the digital camera 100 through the connectors 206 and 216 on the medium side and connectors 92 and 96 on the digital camera 100 side. Interfaces 90 and 94 are connected to the connectors 92 and 96, respectively. The attachment/detachment of the recording media 200 and 210 is detected by the recording medium attachment/detachment detecting 98.

Although this embodiment has exemplified the digital camera 100 including two systems of interfaces and connectors for the attachment of recording media the camera may comprise arbitrary numbers of interfaces and connectors as well as a single interface and a single connector. In addition, interfaces and connectors with different specifications may be used for the respective systems.

As interfaces and connectors, those complying with specifications such as the PCMCIA card specifications and the CF (CompactFlash (registered trademark) card specifications can be used.

When interfaces and connectors complying with the PCMCIA card specifications and the like are used as the interfaces 90 and 94 and the connectors 92 and 96, various types of communication cards can be connected. Such communication cards include a LAN card, a modem card, a USB card, an IEEE1394 card, a P1284 card, a SCSI card, and a communication card for PHS or the like. Connecting various types of communication cards makes it possible to transfer image data and management information attached to image data to/from other computers and peripheral devices such as printers.

The barrier 102 covers the image pickup unit including the photographing lens 10 of the digital camera 100 to prevent the image pickup unit from being contaminated and damaged.

The optical viewfinder 104 is, for example, a TTL viewfinder, and forms a light beam passing through the photographing lens 10 into an image by using a prism and a mirror. Using the optical viewfinder 104 makes it possible to perform a shooting without using the electronic viewfinder function of the image display unit 28. As described above, information associated with some of the functions displayed on the display unit 54 are displayed in the optical viewfinder 104. For example, the information includes an in-focus indication, a shooting preparation completion indication, a camera shake warning indication, a flash charge indication, a flash charge completion indication, a shutter speed indication, an aperture value indication, an exposure correction indication, a recording medium write operation indication, and the like.

The camera posture detection unit 106 includes, for example, a switch which is turned on/off depending on the posture of the camera, and detects the posture state of the digital camera 100. The "posture state" indicates a state from which it can be discriminated whether the camera is in the state of a horizontal position shooting or vertical position shooting.

A communication unit 110 performs various types of communication processing such as RS232C, USB, IEEE1394, P1284, SCSI, modem, LAN, and wireless communication.

A connector (an antenna in a case of wireless communication) 112 is used to connect the digital camera 100 to another device through the communication unit 110.

(Explanation of Operation)

The operation of the digital camera 100 according to this embodiment will be described below.

Figure 2:
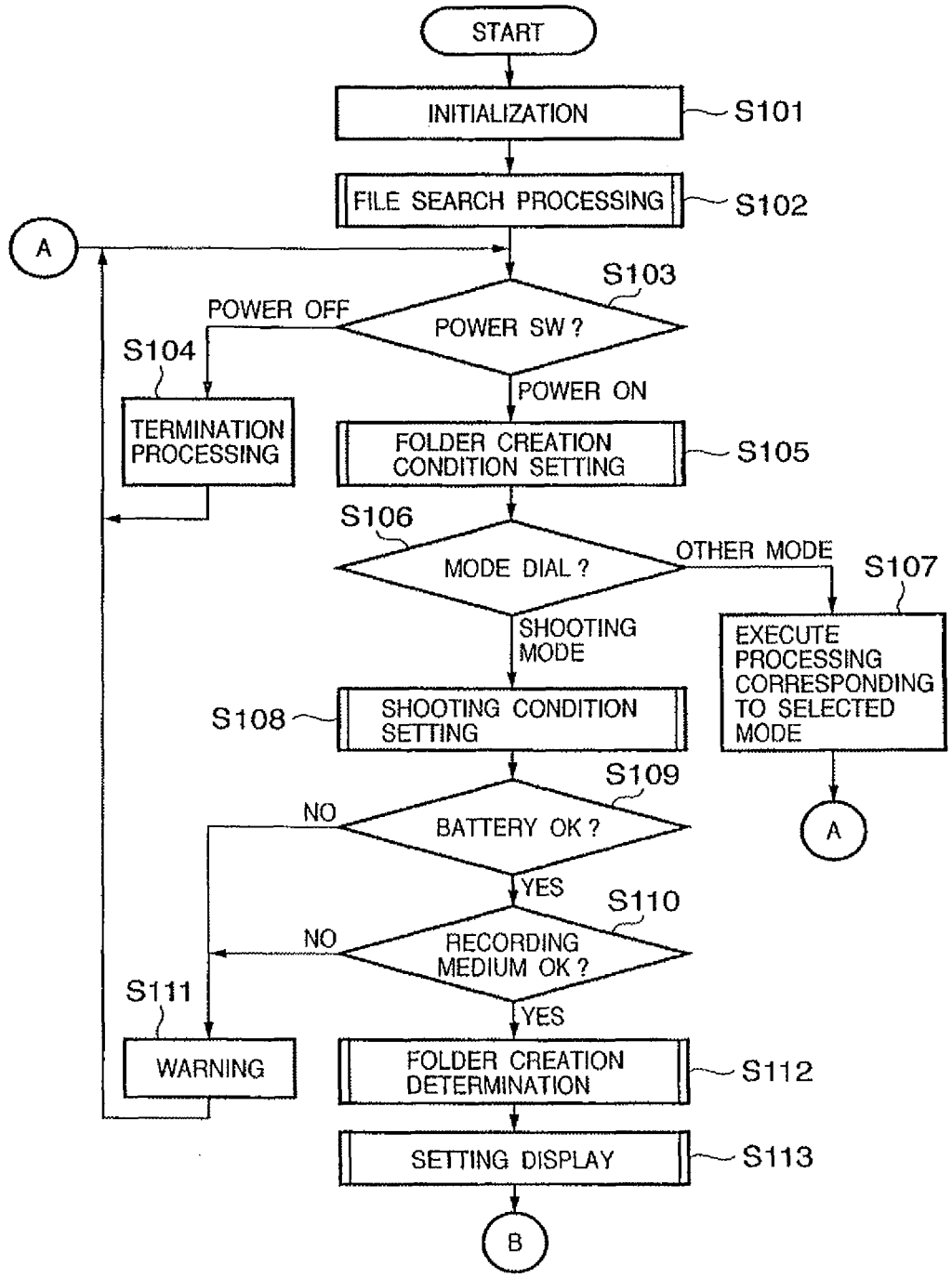
FIG. 2 is a flowchart for explaining the overall operation of a digital camera 100 according to the first embodiment of the present invention.
Figure 3:
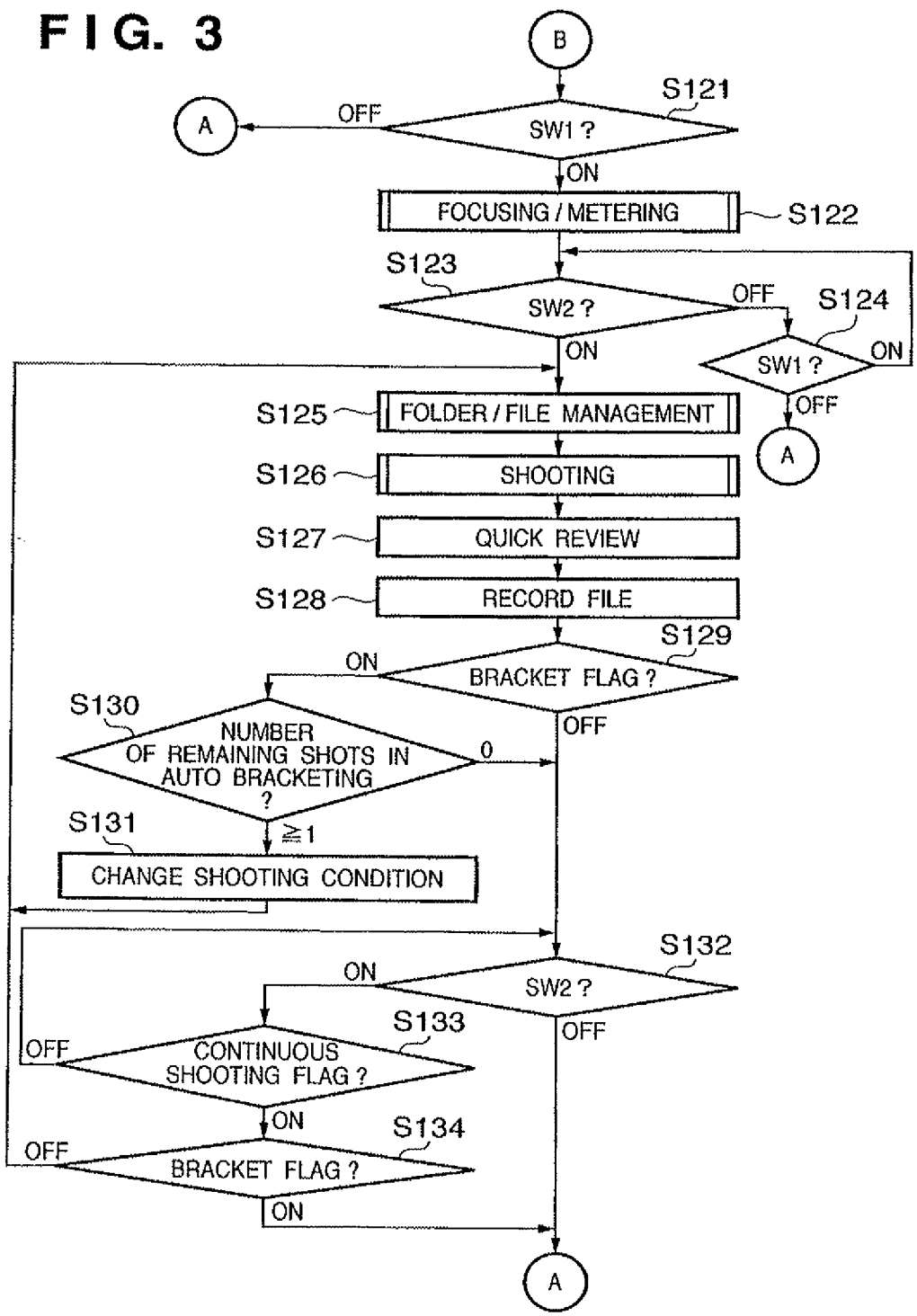
FIG. 3 is a flowchart for explaining the overall operation of the digital camera 100 according to the first embodiment of the present invention.

FIGS. 2 and 3 are flowcharts for explaining the overall operation of the digital camera 100 according to this embodiment.

When the main power supply is turned on upon battery change, the system control circuit 50 initializes flags, control variables, and the like (S101), and performs file search processing in the storage medium (S102). The details of the file search processing in step S102 will be described later with reference to FIG. 7.

The system control circuit 50 determines the set position of the power switch 72 (8103). If the power switch 72 is set OFF, the flow advances to step S104 to perform predetermined termination processing. Termination processing includes, for example, the following processing. The display state of each display unit is changed to the terminated state, and the barrier 102 is closed to protect the image pickup unit. The flags, the parameters including control variables and the like, the set values, and the set mode are recorded on the nonvolatile memory 56. The power control unit 80 interrupts power to portions to which power need not be supplied, including the image display unit 28. When the termination processing is complete, the flow returns, to step S103.

If it is determined in step S103 that the power switch 72 is set ON, the system control circuit 50 sets folder creation conditions (S105). The folder creation condition setting processing in step S105 will be described in detail later with reference to FIG. 8.

The system control circuit 50 determines the set position of the mode dial 60 (S106). If the mode dial 60 is set to the shooting mode, shooting conditions are set (S108). The flow then advances to step S109. The details of the shooting condition setting processing in step S108 will be described later with reference to FIG. 13.

If it is determined in step S106 that the mode dial 60 is set to another mode, the system control circuit 50 executes processing corresponding to the selected mode (S107). When the processing is complete, the flow returns to step S103. In this case, a mode other than the shooting mode is, for example, the playback mode.

In step S109, the system control circuit 50 determines the remaining capacity or operation state of the power supply 86 comprising a battery and the like by using the power control unit 80. If the system, control circuit 50 determines that the state of the power supply 86 poses a problem in terms of the operation of the digital camera 100, the system control circuit 50 issues a predetermined warning corresponding to the problem with an image or sound by using the display unit 54 (S111). The flow then returns to step S103.

If it is determined that there is no problem in the power supply 86, the system control circuit 50 checks the recording medium in step S110. That is, the attachment/detachment of the recording medium 200 or 210 is determined, and management information of image data recorded in the attached recording medium is acquired. In this process, it is determined whether there is a problem in terms of recording/playing back operation with respect to a recording medium. This problem is, for example, that either of the recording media 200 and 210 is not attached or normal read/write operation cannot be performed. If there is some kind of problem, a predetermined warning corresponding to the problem is issued with an image or sound by the display unit 54 (S111). The flow then returns to step S103.

If it is determined in step S110 that there is no problem in the recording medium, the system control circuit 50 determines whether to create a new folder for storing a pickuped image file (to be also simply referred to as an image file) to be created by a next shooting (S112). This folder creation determination processing can also be regarded as save destination determination processing of determining whether a save destination folder for an image file to be created by a next shooting is an existing folder or a new folder. The details of the folder creation determination processing will be described later with reference to FIG. 9.

The system control circuit 50 then displays various setting states in the digital camera 100 with images or sounds by using the display unit 54 (S113). If the image display unit 28 is set ON, the image display unit 28 is also used to display various setting states in the digital camera 100 with images or sounds. The details of this setting display processing will be described later with reference to FIG. 4.

Referring to FIG. 3, the state of the shutter switch SW1 62 is detected (S121). If the shutter switch SW1 62 is not ON (the release button is not pressed halfway), the flow returns to step S103. If the shutter switch SW1 62 is ON, the flow advances to step S122.

In step S122, the system control circuit 50 performs a focusing process (AF processing) to focus the photographing lens 10 on an object, and performs a metering process (AE processing) to determine an aperture value and a shutter speed (S122). In the metering process, flash settings are made, as needed. The details of this focusing/metering process will be described later with reference to FIG. 5.

When the focusing/metering process is complete, the states of the shutter switches SW1 62 and SW2 64 are checked (S123, S124). If the shutter switch SW2 64 is not ON (5123) and the shutter switch SW1 62 is OFF (S124), the flow returns to step S103.

If the shutter switch SW2 64 is set ON (the release button is fully pressed) (S123) while the shutter switch SW1 62 is ON, the flow advances to step S125.

In step S125, the system control circuit 50 manages files and folders by, for example, determining a storage file name to prepare for a shooting and creating a new folder in accordance with settings. The details of this folder/file management processing in step S125 will be described later with reference to FIG. 12.

In step S126, the system control circuit 50 performs shooting processing. First of all, pickuped image data is written (exposure processing) in the memory 30 through the image pickup device 14, A/D converter 16, image processing circuit 20, and memory control circuit 22. Alternatively, this data is written from the A/D converter into the memory 30 through the memory control circuit 22. The image data written in the memory 30 is read out to execute shooting processing comprising development processing of performing various kinds of processes by using the memory control circuit 22 and by using the image processing circuit 20 as needed (S126). The details of this shooting processing will be described later with reference to FIG. 6.

When the shooting processing is complete, quick review processing of displaying the pickuped image on the image display unit 28 is performed (S127).

If no deletion instruction is issued during a predetermined quick review period, the system control circuit 50 performs recording processing in step S128. That is, the pickuped image data written in the memory 30 is read out, and various kinds of image processing are performed by using the memory control circuit 22 (also using the image processing circuit 20 as needed). Image compression processing corresponding to the set mode is performed by using the codec 32 to generate a pickuped image file complying with a predetermined recording file format by adding additional information such as a posture flag to the header or the like. The pickuped image file is then written at a predetermined recording destination in the recording medium 200 or 210 such as a memory card or compact flash card through the interface 90 or 94 and the connector 92 or 96.

If the image display unit 28 is ON, an indication like "BUSY" indicating that write operation is being performed is displayed on the image display unit 28 while image data is written in the recording medium 200 or 210. In addition, a recording medium write operation indication indicating such as blinking of the LED is displayed on the display unit 54.

The system control circuit 50 determines the state of a bracket flag stored in an internal memory (not shown) or the memory 52 (S129). The bracket flag as a flag representing the execution/non-execution of auto bracketing. If the bracket flag is released, the flow advances to step S132.

If the bracket flag is set (5129) and the number of remaining shots in auto bracketing is equal to or more than one (S130), the system control circuit 50 changes shooting conditions in auto bracketing (S131). The flow then returns to step S125. Shooting conditions in auto bracketing include, for example, an exposure correction value and a white balance value.

In step S132, the state of the shutter switch SW2 64 is detected. If the shutter switch SW2 64 is OFF, the flow returns to step S103. If the shutter switch SW2 64 is ON, the state of a continuous shooting flag stored in the internal memory or the memory 52 in the system control circuit 50 is detected. If the continuous shooting flag is set, the flow advances to step S134.

In step S134, the system control circuit 50 determines the state of the bracket flag as in step S129. If the bracket flag is released (S134), the flow returns to step S125 to perform a next shooting. If the bracket flag is set, the flow returns to step S103. This is because, in this embodiment, a setting is made such that if the bracket flag is ON, no continuous shooting is performed.

(Setting Display Processing)

Figure 4:
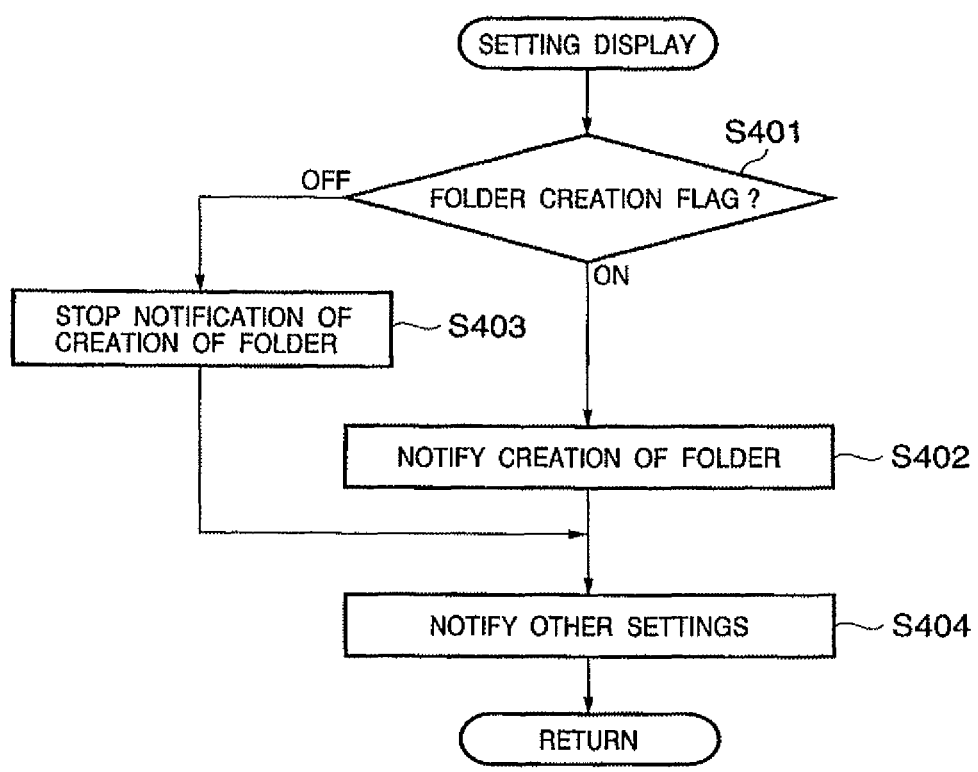
FIG. 4 is a flowchart showing the details of setting display processing in step S113 in FIG. 2.

FIG. 4 is a flowchart showing the details of the setting display processing in step S113 in FIG. 2.

First of all, the system control circuit 50 determines the state of a folder creation flag stored in the internal memory or the memory 52 in the system control circuit 50 (S401). If the folder creation flag is set, information indicating that a new folder is created at the time of a next shooting is notified with image or sound by the display unit 54 (S402). If the image display unit 28 is ON, folder creation is notified with an image or sound by the image display unit 28.

If the folder creation flag is released (S401), notification of folder creation on the display unit 54 (including the image display unit 28) is stopped (S403). As will be described later, however, if the display unit which has received information indicating that a folder has been created will immediately update the state, i.e., will stop notification of folder creation, there is no need to execute step S403 again.

In step S404, the system control circuit 50 notifies various setting states in the digital camera 100 by the display unit 54 (and the image display unit 28 if it is ON) using images or sounds (or updates notification contents) in addition to the folder creation flag, and terminates the processing.

Figure 14:
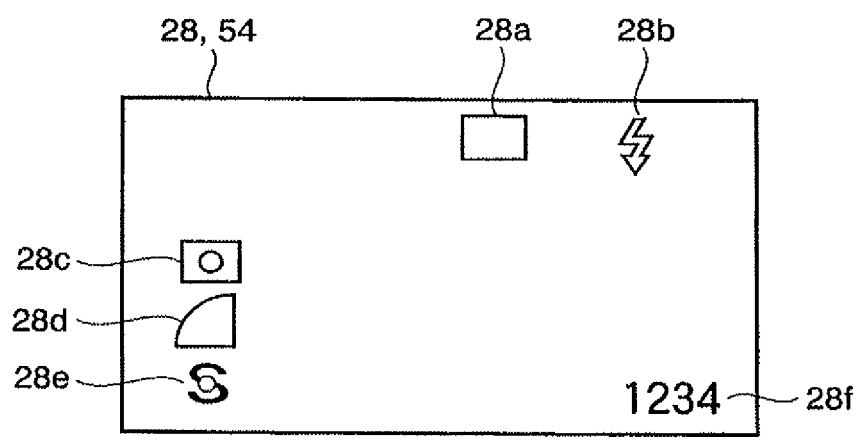
FIG. 14 is a view showing an example of display by setting display processing according to the first embodiment of the present invention.

FIG. 14 shows an example of display performed by the display unit 54 (and the image display unit 28) when the processing in steps S403 and S404 is performed. With the processing in step S404, a single shot/continuous shooting indication 28a, a flash indication 28b, a metering scheme indication 28c, a compression ratio indication 28d, an indication of the number of recording pixels 28e, and an indication of the number of remaining shootable images 28f are displayed.

Figure 15:
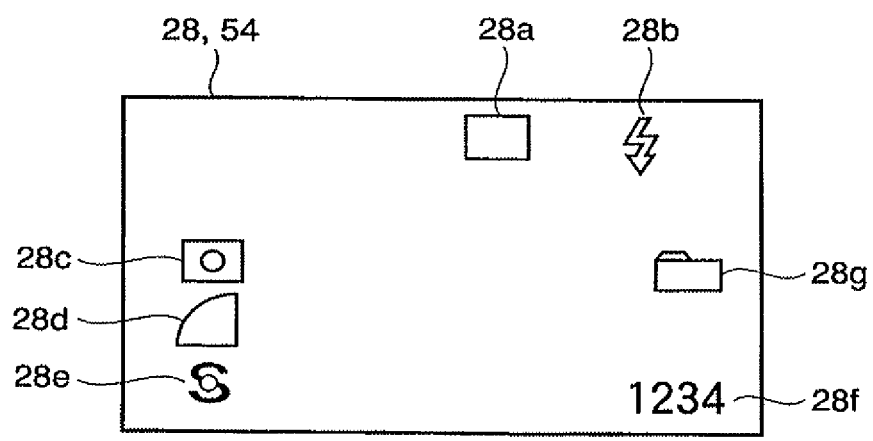
FIG. 15 is a view showing an example of display by setting display processing according to the first embodiment of the present invention.

FIG. 15 shows an example of display performed by the display unit 54 (and the image display unit 28) when the processing in steps S402 and S404 is performed. As in the case shown in FIG. 14, a single shot/continuous shooting indication 28a, a flash indication 28b, a metering scheme indication 28c, a compression ratio indication 28d, an indication of the number of recording pixels 28e, and an indication of the number of remaining shootable images 28f are displayed. In addition, a folder creation indication 28g is displayed by the processing in step S402.

As described above, with the processing in step S106, in a mode other than the shooting mode, the setting display processing in step S113 is not performed, and no folder creation indication is displayed. For example, in the playback mode, with the processing in step S107, display for the playback mode is performed, and no folder creation indication is displayed.

While the quick review processing in step S127 is performed, a folder creation indication (for example, the indication 28g in FIG. 15) may be either be displayed or not displayed. Likewise, during the quick review processing in step S127, various setting indications (e.g., the indications 28a to 28f in FIG. 15) in the digital camera 100 may be either displayed or not displayed in addition to the folder creation indication.

(Focusing/Metering Process)

Figure 5:
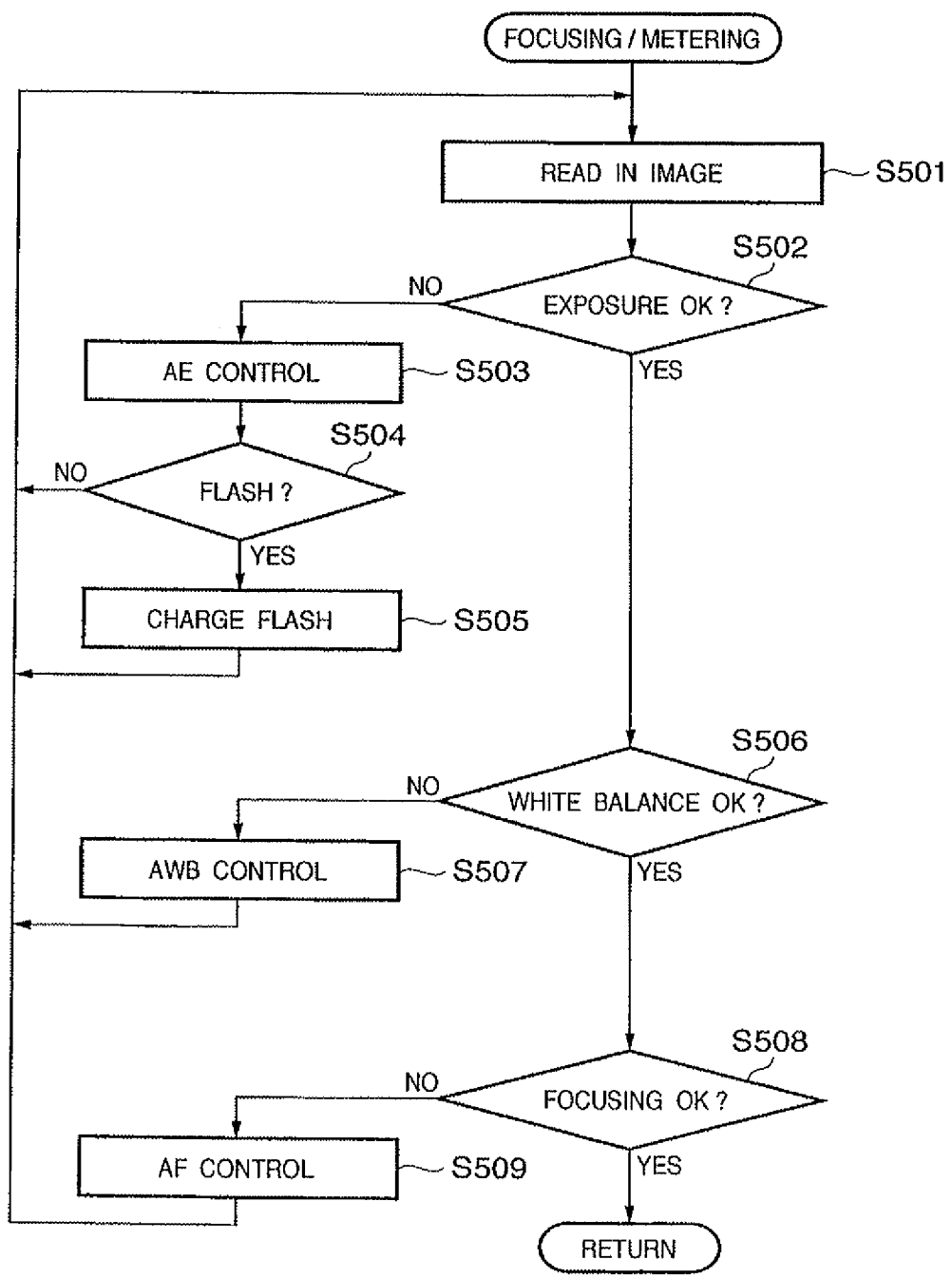
FIG. 5 is a flowchart showing the details of a focusing/metering process in step S122 in FIG. 3.

FIG. 5 is a flowchart for explaining the details of a focusing/metering process in step S122 in FIG. 3.

The system control circuit 50 reads out charge signals from the image pickup device 14, and sequentially reads pickuped image data in the image processing circuit 20 through the A/D converter 16 (S501). The image processing circuit 20 performs predetermined arithmetic processing by using the sequentially read image data. This arithmetic processing result is used for AE (Auto Exposure) processing, EF (Electronic Flash pre-emission) processing, AF (Auto Focus) processing, and AWB (Auto White Balance) processing of the TTL (Through The Lens) system.

In each processing in this case, of the total number of pickuped pixels, a necessary number of pixels of a specific portion corresponding to necessity are extracted and used for arithmetic processing. This makes it possible to perform optimal arithmetic processing for each of different modes, e.g., the center weighted mode, average mode, and evaluation mode in each of the AE processing, EF processing, AWB processing, and AF processing of the TTL system.

The system control circuit 50 performs AE control by using the exposure control unit 40 (S503) until it is determined by using the arithmetic processing result obtained by the image processing circuit 20 that an automatic exposure value is proper (S502). The system control circuit 50 determines by using the measurement data obtained by AE control whether the flash is necessary (S504). If the flash is necessary, the flash flag is set to charge the flash 48 (S505).

If it is determined in step S502 that an automatic exposure value is proper, measurement data and/or setting parameters (metering data) in automatic exposure control are stored in the internal memory or the memory 52 in the system control circuit 50.

When the AE control processing is complete, the system control circuit 50 performs auto white balance processing by using the arithmetic processing result in the image processing circuit 20 and the measurement data obtained by AE control in steps S506 and S507. Color processing parameters are adjusted by the image processing circuit 20 in step S507 until it is determined in step S506 that an auto white balance Value is proper.

If it is determined that an auto white balance value is proper (S506), measurement data or setting parameters in AWB control are in the internal memory or the memory 52 in the system control circuit 50.

The system control circuit 50 then performs AF control by using the measurement data obtained by AE control and AWB control in steps S508 and S509. That is, the system control circuit 50 drives the AF lens and calculates the degree of focusing by using the focusing control unit 42 until it is determined in step S508 that an in-focus state is obtained.

If it is determined that an in-focus state is obtained (S508), measurement data and/or setting parameters in AF control are stored in the internal memory and the memory 52 in the system control circuit 50, and the focusing/metering process is terminated.

(Shooting Processing)

Figure 6:
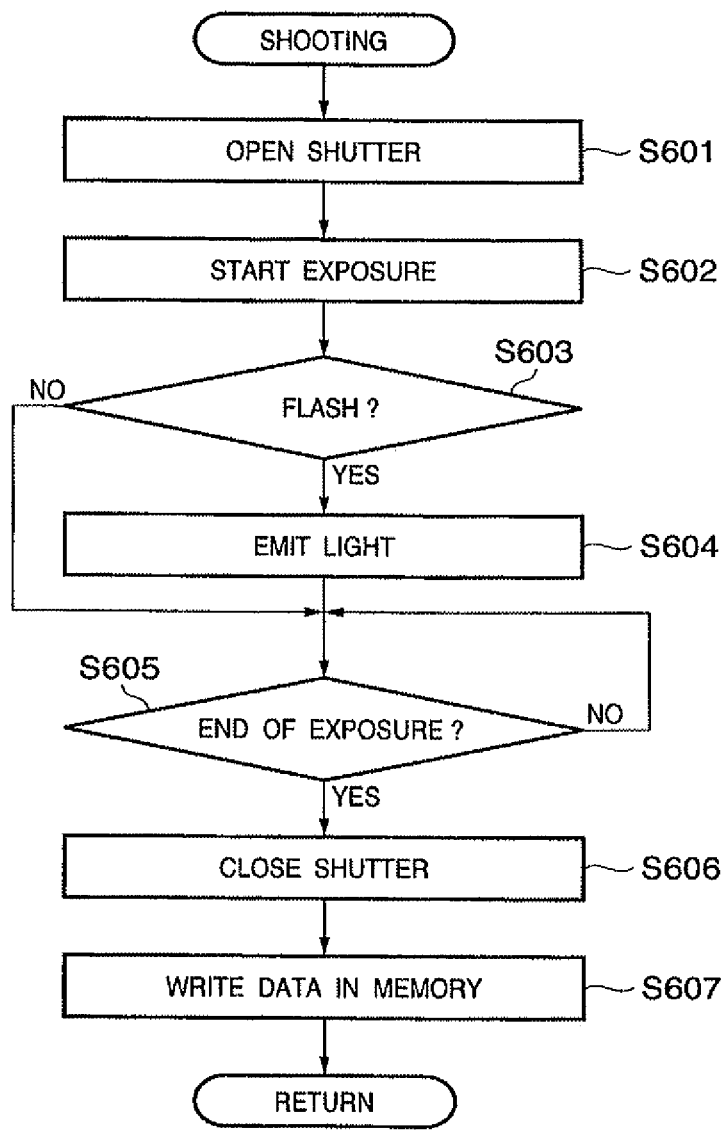
FIG. 6 is a flowchart for explaining the details of shooting processing in step S126 in FIG. 3.

FIG. 6 is a flowchart for explaining the details of the shooting processing in step S126 in FIG. 3.

The system control circuit 50 causes the exposure control unit 40 to start exposure by the image pickup device 14 by opening the shutter 12 having the stop function in accordance with an aperture value on the basis of the metering data stored in the internal memory or the memory 52 (S601. S602).

It is determined in accordance with the flash flag whether it is necessary to emit light by using the flash 48 (5603). If it is determined that the flash is necessary, the flash 48 is caused to emit light (S604).

The system control circuit 50 waits for the elapse of the exposure time of the image pickup device 14 in accordance with the metering data (S605), and closes the shutter 12 (S606), thereby terminating the exposure. A charge signal is read out from the image pickup device 14, and the pickuped image data is written in the memory 30 through the A/D converter 16, image processing circuit 20, and memory control circuit 22. Alternatively, the data is written from the A/D converter 16 into the memory 30 through the memory control circuit 22 (S607). If the pickuped image data write in the memory 30 is complete, the shooting processing is terminated.

(File Search Processing)

Figure 7:
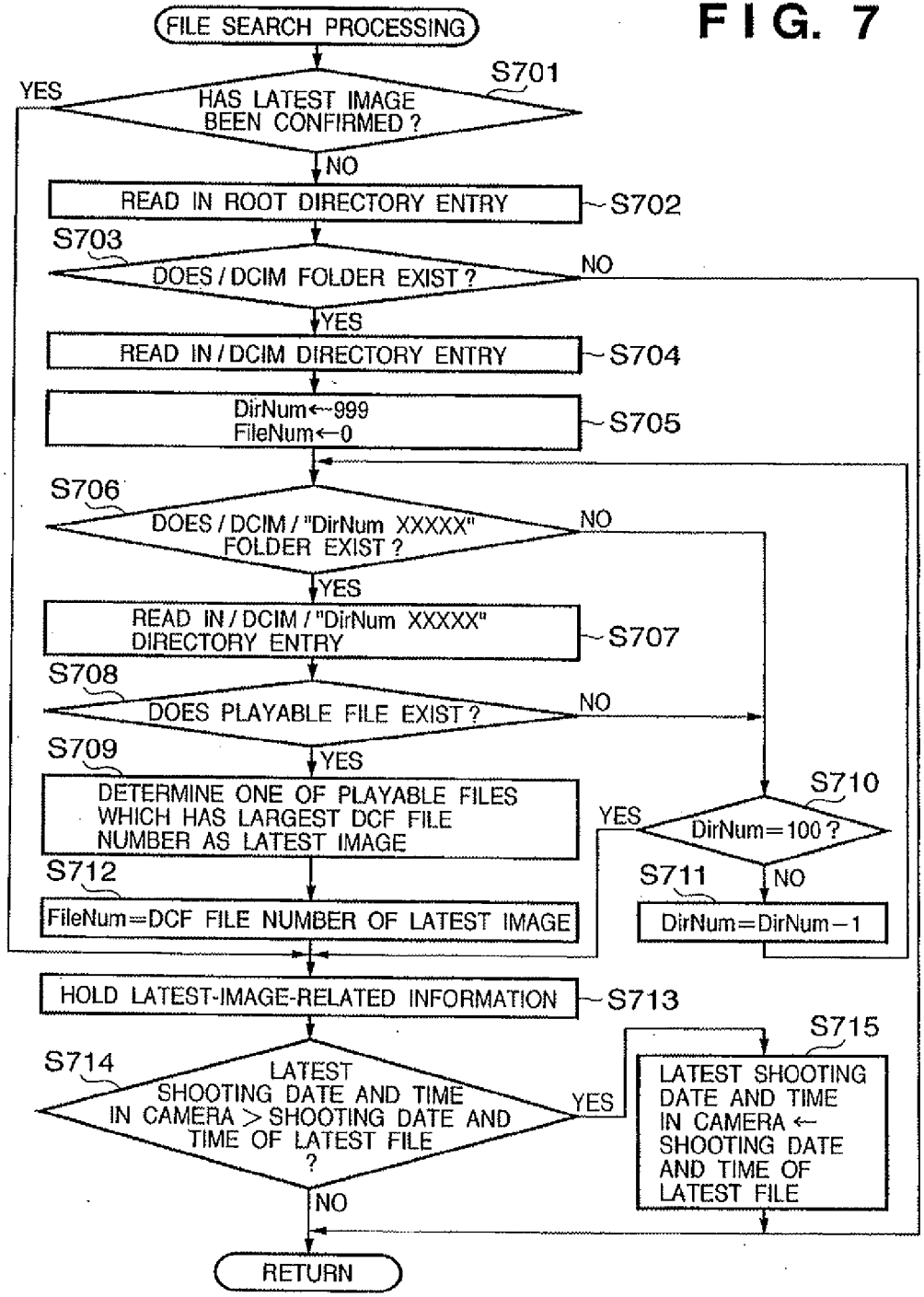
FIG. 7 is a flowchart for explaining the details of file search processing in step S102 in FIG. 2.

FIG. 7 is a flowchart for explaining the details of file search processing in step S102 in FIG. 2.

If the latest image has not been searched out (S701), the system control, circuit 50 reads out the root directory entry from the recording medium 200 or 210 (S702).

The root directory entry read out in step S702 is analyzed to determine the presence/absence of a "/DCIM" folder (directory) (S703). If the "/DCIM" folder does not exist, it is determined that there is no playback image, and the processing is terminated.

If the "/DCIM" folder exists in the root directory entry, the directory entry of the "/DCIM" folder is read in. A search folder number (DirNum) is set to 999 which is the maximum number in the DCF specifications (Design rule for Camera File system), and a variable (FileNum) representing the number of files is set to 0 (S705).

It is then checked whether there is a corresponding folder (S706). More specifically, it is checked whether a [/DCIM/(DirNum)XXXXX] folder (directory) exists in the recording medium. In this case, (DirNum) in a folder name is the value of the variable DirNum, i.e., a DCF directory number (999 to 100), and X is an arbitrary ASCII one-byte alphameric character. For example, if the value of the variable DirNum is "100", and XXXXX is "ABCDE", it represents [/DCIM/100ABCDE].

If it is determined in step S706 that there is a folder having a name in the forth of "number of 100 to 999+five one-byte alphameric characters", the content (directory entry) is read out (S707). It is then determined whether there is any playable file (S708). This determination can be performed by checking the presence/absence of a file having a predetermined extension (e.g., .jpg).

If it is determined in step S708 that there is no playable file, it is determined whether DirNum has reached the minimum value (=100). If the value of DirNum>100, the current value is decremented by one (S711). The flow then returns to step S706 to search for a next folder. If it is determined in step S710 that the value of DirNum is 100, the flow advances to step S713.

If it is determined in step S708 that there are playable files, one of the playable files which has the largest DCF file number is determined as the latest image (S709). A DCF file number is a number in the range of "0001 to 9999" forming the lower four characters of a DCF file name (eight characters). In step S712, the DCF file number of the latest image is set to the variable FileNum. In step S713, the value of the variable FileNum is stored as latest-image-related information in the internal memory or the memory 52 in the system control circuit 50. The flow then advances to step S714.

If it is determined in step S701 that a latest image has already been confirmed, the values of DirNum and FileNum which have already been determined are stored as latest-image-related information in the internal memory or the memory 52 in the system control circuit 50 (S713). The flow then advances to step S714. For example, in the following case, it is determined in step S701 that a latest image has been confirmed. That is, for example, the DCF directory number (DirNum) and DCF file number (FileNum) of the latest image determined in the previous file search processing are stored/held in the nonvolatile memory 56 or the like.

The latest-image-related information stored in the internal memory or the memory 52 in the system control circuit 50 in step S713 includes the DCF directory number (DirNum) of the folder in which the above latest image exists and the DCF file number (FileNum) of the latest image. In this embodiment, in addition to these pieces of information, the total number of playable files existing in the folder (directory), the shooting date and time and time stamp of the latest image, and the like are also stored as latest-image-related information.

The above description has been made on the assumption that the DCF file number of a latest image is held in the nonvolatile memory 56 or the like, and latest-image-related information is stored in the internal memory or the memory 52 in the system control circuit 50. However, in addition to the DCF file number of a latest image, other pieces of latest-image-related information may be held in the nonvolatile memory 56 or the like.

When a new image is pickuped, a save destination folder and a file name are determined by using a DCF directory number and DCF file number following the DCF directory number and DCF file number of the latest image searched out in this processing.

In step S714, the latest shooting date and time in the digital camera 100, which are stored in the nonvolatile memory 56 or the like, are compared with the shooting date and time of the latest image determined in the above processing. The older date and time are stored as the latest shooting date and time (S715). The latest shooting date and time are used in date/time change determination processing to be described with reference to FIG. 10. In this case, of the latest shooting date and time stored in the digital camera 100 and the shooting date and time of the latest Image in the recording medium, the older date and time are used as the latest shooting date and time.

Consider, for example, a case wherein a storage medium on which an image older than the latest shooting date and time stored in the digital camera 100 is recorded as the latest image is loaded in the digital camera 100. In this case, a next pickuped image file is easily stored in a new folder instead of an existing folder in the recording medium.

In other words, this embodiment is an embodiment aimed at increasing the probability at which it is determined that there is a change of date and time (=new folder creation) in date/time change determination processing to be described later with reference to FIG. 10. Obviously, only the latest shooting date and time stored in the digital camera 100 or the shooting date and time of the latest image may be used as the latest shooting date and time in the processing in FIG. 10 without performing the processing in steps S713 and S714. Alternatively, the embodiment may be configured to allow the user to select the use of either value as the latest shooting date and time.

According to the flowchart of FIG. 7, a file having the largest DCF file number as the latest image. However, this is merely an example. For example, a search may be made for the latest image in a specific DCF directory in the DCF specifications or an image file recorded last on the recording medium.

(Folder Creation Condition Setting Processing)

Figure 8:
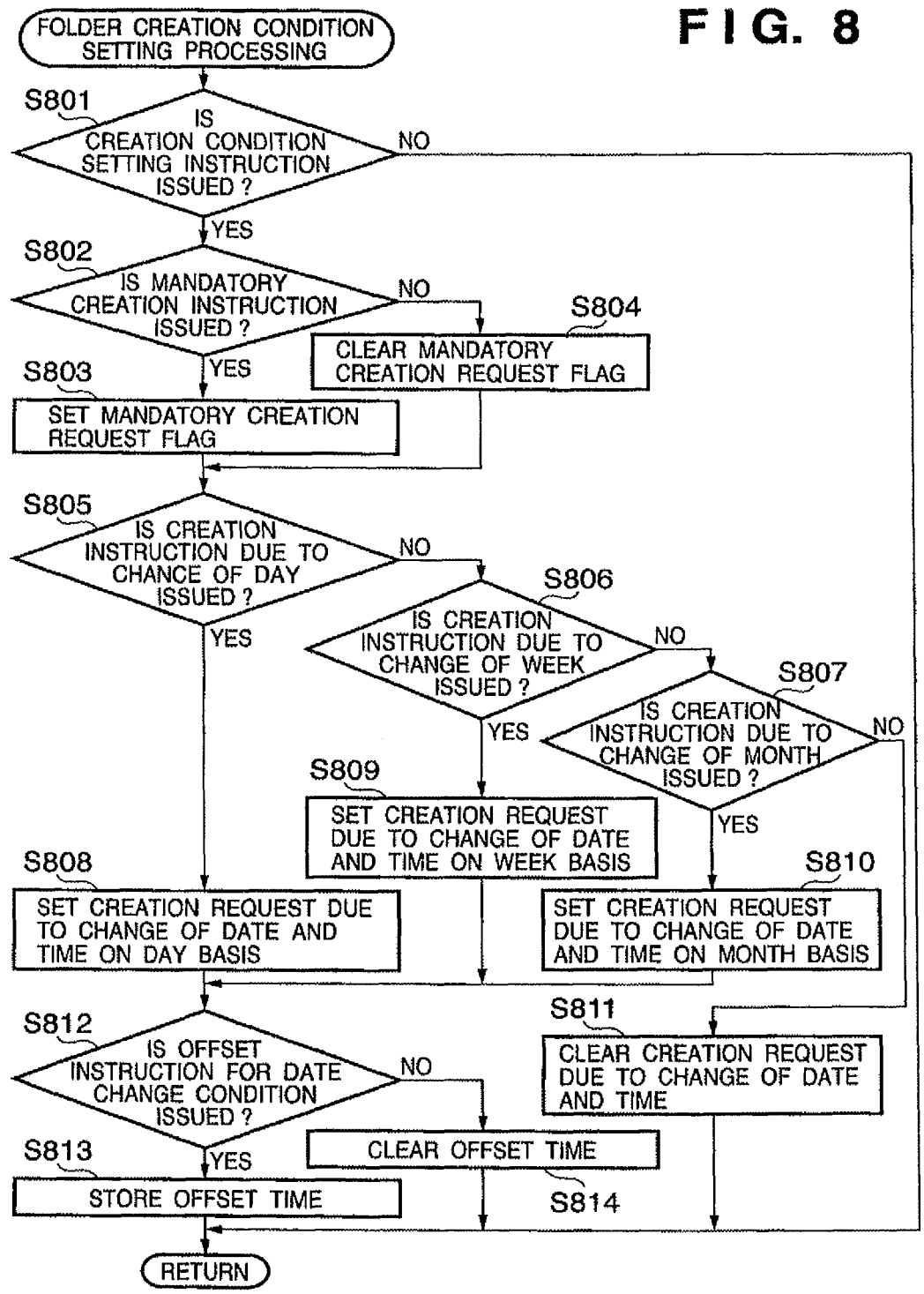
FIG. 8 is a flowchart for explaining the details of folder creation condition setting processing in step S105 in FIG. 2.

FIG. 8 is a flowchart for explaining the details of the folder creation condition setting processing in step S105 in FIG. 2.

Upon determining that an instruction to set folder creation conditions is issued by the user using the operation unit 70 (S801), the system control circuit 50 performs folder creation condition setting processing to be described later.

Assume that in either of the following cases, it is determined that an instruction to set folder creation conditions is issued:

when the new folder creation request button 74 is pressed, and when a folder creation request (mandatory creation request) is issued through a folder creation condition setting menu window (to be described later).

In step S802, it is determined whether a mandatory creation request for a folder is issued. In this case, in the following cases, it is determined that the request is issued:

when the new folder creation request button 74 is pressed while no mandatory creation request flag is set, and when a folder mandatory creation request is issued through the folder creation condition setting menu window.

If it is determined that mandatory supply processing has been performed, a mandatory creation request flag to be provided as one area of the nonvolatile memory 56 or the like is set (5803). If it is determined that no request is issued, the mandatory creation request flag is cleared (S804). When the new folder creation request button 74 is pressed while the mandatory creation request flag is set, the mandatory creation request flag is cleared.

In steps S805 to S807, folder creation conditions which can be set through the menu window are checked. Assume that in this embodiment, a change (a change of date and time) of either of day, week, and month can be set as a folder creation condition from the menu window. Assume that such a folder creation condition is recorded as a folder creation request due to a change of date and time on the nonvolatile memory 56 or the like.

In addition, assume that in this embodiment, an offset time can be set in addition to a folder creation condition due to a change of date and time. An offset time is a value for offsetting a reference time for the determination of a change of date and time from 0:00 a.m. if there is no offset, processing is performed while it is regarded that the day has changed at a point of time after 0:00 a.m. If, however, "7:00 a.m." (or "+7 hours") is set as an offset time, it is not determined that the day has changed even after 0:00 a.m. until 7:00 a.m. Since an offset time can be set, for example, images pickuped in an event across days can be recorded in one folder or a new folder is created with reference to the usual hour of rising. Note that an offset time can be designated in the form of a specific time like "7:00 a.m." or a time difference (e.g., +7 hours or −2 hours) relative to a reference time (0:00 a.m. in general).

Figure 24:
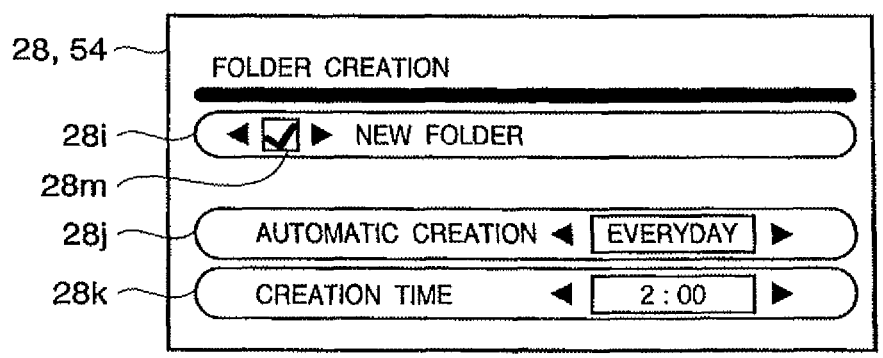
FIG. 24 is a view showing an example of a folder creation condition setting menu window presented by the digital camera according to the embodiment of the present invention.

FIG. 24 shows an example of the folder creation condition setting menu window in the digital camera 100 according to this embodiment.

The folder creation condition setting menu window is displayed on the display unit 54 and the image display unit 28. Note that such a menu window can be displayed by tracking the menu hierarchy from the initial menu window which is generally displayed when a menu key is pressed. Obviously, a shortcut key can be provided to directly invoke this menu window.

The folder creation condition setting menu window includes a first area 28*i* for issuing a folder mandatory creation request, a second area 28*j* for issuing a folder creation request due to a change of date and time, and a third area 28*k*.

When a folder mandatory creation request is to be issued, the user operates predetermined keys such as the up and down keys of the operation unit 70 to set the first area 28*i* in a selected state. The user then places a checkmark in a checkbox 28*m* in the area 28*i* by operating predetermined keys such as the left and right keys, and then presses the execution key of the operation unit 70. With this operation, the menu window closes (switches to a higher-order menu window), and a folder mandatory creation request is designated in the digital camera 100. The folder mandatory creation request may be canceled by pressing the executing key while the checkbox 28*m* is unchecked.

Note that, as described above, in this embodiment, a folder mandatory creation request can be designated and canceled by pressing the new folder creation request button 74 without operating any menu window.

When a folder creation request due to a change of date and time is to be issued, the area 28*j* is set in a selected state to set a change factor. The user then operates the left and right keys to display a desired condition. In this case, date and time change factors include a change of day ("every day"), a week change ("Monday", "Tuesday", "Wednesday", "Thursday", "Friday", "Saturday", and "Sunday"), a change of month ("every month"), and a specific day (any day from the 1st day to the 31st day) of the month.

However, this is for the easy explanation and understanding of this embodiment. In practice, a specific date may be designated like "○ (month) X (day)" or "holiday", or may be set in smaller time units. For example, the embodiment may be configured to designate a time unit or a specific date (e.g., ○ (month) X (day) Δ (hour)). In addition, a condition may be set such that specific time interval can be designated. In this method, for example, a time interval between two specific times is designated. As described above, a date and time change factor can be regarded as a condition associated with the lapse of date and time from a predetermined reference date and time or a calendar. Not that when a folder creation request due to a change of date and time is to be canceled, for example, a state in which "OFF" is displayed may be set.

If an offset time setting is not to be changed, the execution key of the operation unit 70 is pressed. With this operation, the menu window closes (switches to a higher-order menu window), and a folder creation request due to a change of date and time is designated in the digital camera 100.

When an offset time is to be set or an existing set time is to be changed, the third area 28*k* is operated. The left and right keys are operated to display a desired time while the third area 28*k* is selected, and the execution key is pressed. An offset time can be set, for example, in increments of 1 min from 0:00 to 23:59, or can be set as a relative time difference (±0:00 to 11:59) with reference to 0:00.

Referring back to FIG. 8, if a folder creation instruction due to a change of date and time is issued (S805), a setting is made on a day basis as a creation request due to a change of date and time which is stored in the nonvolatile memory 56 or the like (S808). If a creation instruction due to a change of week is issued (S806), a setting is made on a week basis as a creation request due to a change of date and time which is stored in the nonvolatile memory 56 or the like (S809). If a creation instruction due to a month change is issued (5807) a setting is made on a month basis as a creation request due to a change of date and time which is stored in the nonvolatile memory 56 or the like (5810). If there is no folder creation instruction due to any date and time unit, a creation request due to a change of date and time which is stored in the nonvolatile memory 56 or the like is cleared (S811). The processing is then terminated.

If a folder creation instruction on any date and time basis is issued, the presence/absence of an offset instruction for a date and time change detection point is checked (S812). If an offset instruction is issued, the offset time is stored in the nonvolatile memory 56 or the like (S813). If no offset instruction is issued, the offset time is cleared, i.e., the offset is set to 0 (S814).

Folder creation conditions set in this case are referred to in folder creation determination processing and file management processing (to be described later), and are used to determine whether to create a new folder.

The above description has exemplified the case wherein a creation condition due to a change of date and time, e.g., a change of day, week, or month, is exclusively set. However, a setting based on a combination of changes of date and time may be made. For example, a setting may be made so as to perform folder creation under two conditions, i.e., every Monday and the first day of every month. A date and time change factor may be on an hour basis instead of a day basis, and may be a condition that allows designation of a specific date and time. This method is a method of designating, for example, a specific month, a specific day, and a specific hour. In addition, a condition may be set so as to allow designation of a specific time interval. This method is a method of designating, for example, a time interval between two specific times.

(Folder Creation Determination Processing)

Figure 9:
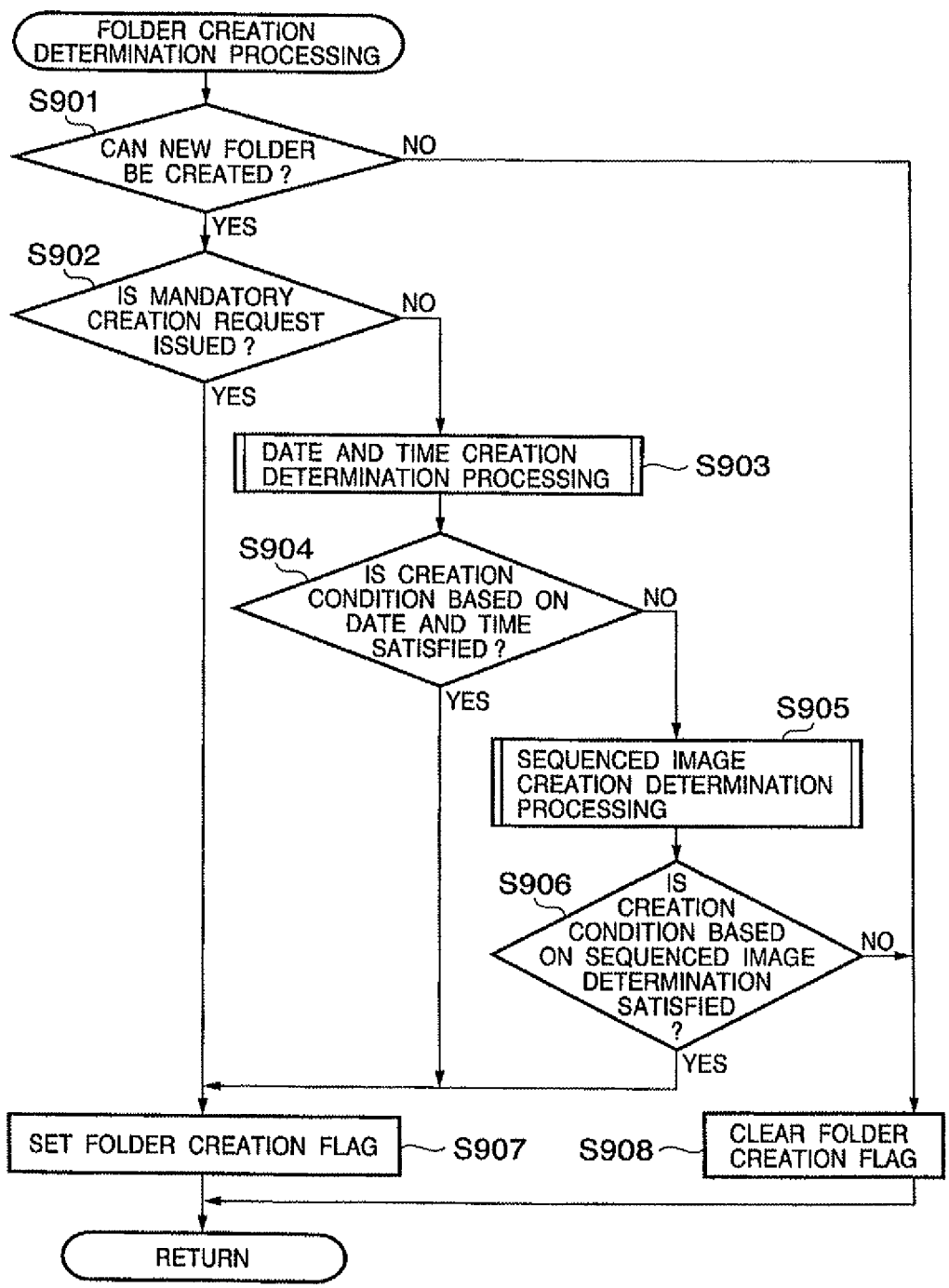
FIG. 9 is a flowchart for explaining the details of folder creation determination processing in step S112 in FIG. 2.

FIG. 9 is a flowchart showing the details of the folder creation determination processing in step S112 in FIG. 2.

First of all, the system control circuit 50 determines whether a new folder can be created in consideration of limitations such as the DCF specifications (S901). For example, in the DCF specifications, DCF directory numbers are limited to 100 to 999, and hence a folder having a DCF directory number outside this range cannot be created. More specifically, in specifications which are designed to create folders and files in ascending order of DCF directory numbers and file numbers, a new folder cannot be created if the DCF directory number of a folder in which the latest image exists is 999.

If it is determined that a new folder cannot be created, the folder creation flag stored in the internal memory or the memory 52 in the system control circuit 50 is cleared (S908), and the processing is terminated.

If it is determined in step S901 that a new folder can be created, new folder creation determination is performed. First of all, it is determined in step S902 whether a mandatory creation request is issued. In this embodiment, if the mandatory creation request flag stored in the nonvolatile memory 56 or the like is set in step S803 in FIG. 8, it is determined that a mandatory creation request is issued. In this case, the system control circuit 50 sets a folder creation flag stored in the internal memory or the memory 52 (S907). The processing is then terminated.

If it is determined in step S902 that no mandatory creation request is issued, date and time creation determination processing is performed to determine whether a new folder creation request due to a change of date and time is issued (S903). If it is determined that the new folder creation condition due to a change of date and time holds, the system control circuit 50 sets a folder creation flag stored in the internal memory or the memory 52 in the system control circuit 50 (S907). This processing is then terminated.

If it is determined in step S904 that the new folder creation condition does not hold, sequenced image creation determination processing is performed to determine whether a new folder creation request based on a sequenced image condition (to be described later) is issued. If it is determined that the new folder creation condition based on the sequenced image condition holds, a folder creation flag stored in the internal memory or the memory 52 in the system control circuit 50 is set (8907). The processing is then terminated. Note that information indicating that a flag is set by the sequenced image creation determination may be stored in advance together with the flag.

If it is determined in step S906 that the new folder creation condition does not hold, the folder creation flag stored in the internal memory or the memory 52 in the system control circuit 50 is cleared (8908). This processing is then terminated.

(Date and Time Creation Determination Processing)

Figure 10:
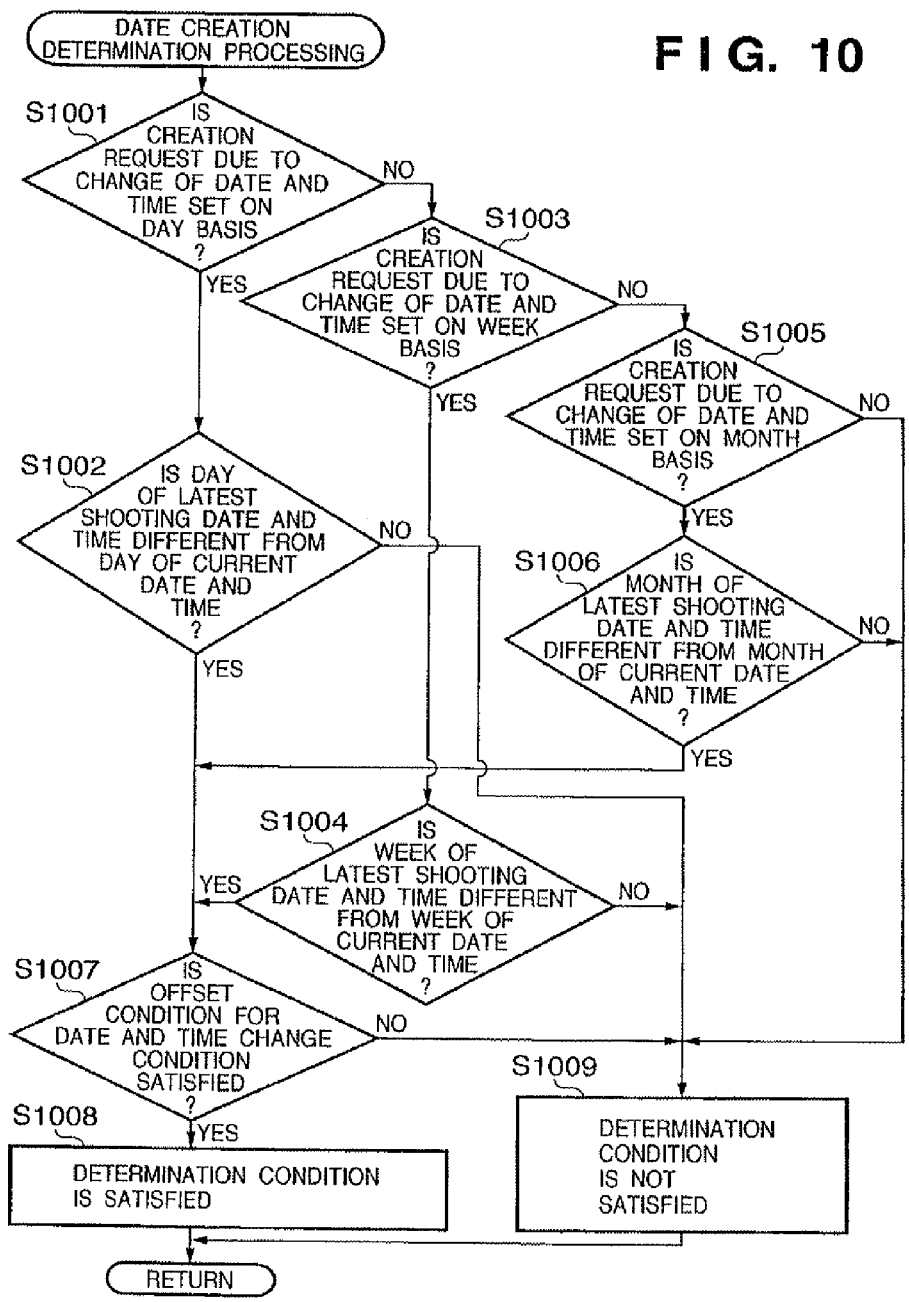
FIG. 10 is a flowchart for explaining the details of date and time creation determination processing in step S903 in FIG. 9.

FIG. 10 is a flowchart for explaining the details of the date and time creation determination processing in step S903 in FIG. 9. Note that the "shooting date and time of latest image" in this processing are the date and time which are determined in step S714 in which the above file search processing is performed, and stored in step S715.

If a creation request due to a change of date and time is on a day basis (S1001), it is determined whether the day of the shooting date and time (time stamp) of the latest image differs from the current day (based on the value of the built-in timepiece of the digital camera 100) (S1002). If it is determined that the days differ from each other, the flow advances to offset condition determination for a date condition (S1007). If it is determined that the days coincide with each other, the flow advances to step S1009.

If the creation request due to a change of date and time is on a week basis (S1003), it is determined whether the week of the shooting date and time of the latest image differs from the week of the current date and time (S1004). If it is determined that the weeks differ from each other, the flow advances to offset condition determination for a date condition (S1007). If it is determined that the weeks coincide with each other, the flow advances to step S1009. Note that a specific week of the year or month in which a specific year, month, and day are included can be determined by using a calendar function which the digital camera 100 generally has.

If the creation request due to a change of date and time is on a month basis (S1005), it is determined whether the month of the shooting date and time of the latest image differs from the month of the current date and time (S1006). If it is determined that the months differ from each other, the flow advances to offset condition determination for a date condition (S1007). If it is determined that the months coincide with each other, the flow advances to step S1009.

If it is determined that there is no creation request due to any change of date and time, no date change determination is performed with respect to the current date and time and the shooting date and time of the latest image in step S1009 to exit the processing.

In step S1007, an offset condition for a date and time change condition is determined. More specifically, if an offset time is set and the difference between dates is one day, determination is performed in consideration of the offset time. If, for example, it is determined that weeks or months differ from each other because the dates differ by one day, it is determined whether the dates differ from each other even in consideration of the offset time. Consider a case wherein it is determined in step S1006 that the months differ from each other, and that the shooting date and time of the latest image is set to Jan. 31, 2005, the current date and time are set to Feb. 1, 2005, 3:00 a.m., and the offset time is set to 7:00 a.m. (or "+7 hours"). In this case, since the current date and time have not reached the offset time, it is determined that there is no change of date and time.

If it is determined that there is a change of date and time even in consideration of the offset time, it is determined that a determination condition is satisfied (S1008). The processing is then terminated. If it is determined that there is no change of date and time in consideration of the offset condition, it is determined that a determination condition is not satisfied (S1009). The processing is then terminated.

According to the case shown in FIG. 10, a creation condition due to a change of date and time, e.g., a change of day, week, or month, is exclusively determined in accordance with the condition setting described with reference to FIG. 8. As in the case of settings, however, determination may be performed on the basis of a combination of conditions. For example, determination may be performed to allow folder creation on every Monday and the first day of every month. A date and time change factor may be on an hour basis instead of a day basis, and may be a condition that allows designation of a specific date and time. This method is a method of designating, for example, a specific month, a specific day, and a specific hour. In addition, a condition may be set so as to allow designation of a specific time interval. This method is a method of designating, for example, a time interval between two specific times.

(Sequenced Image Creation Determination Processing)

Figure 11:
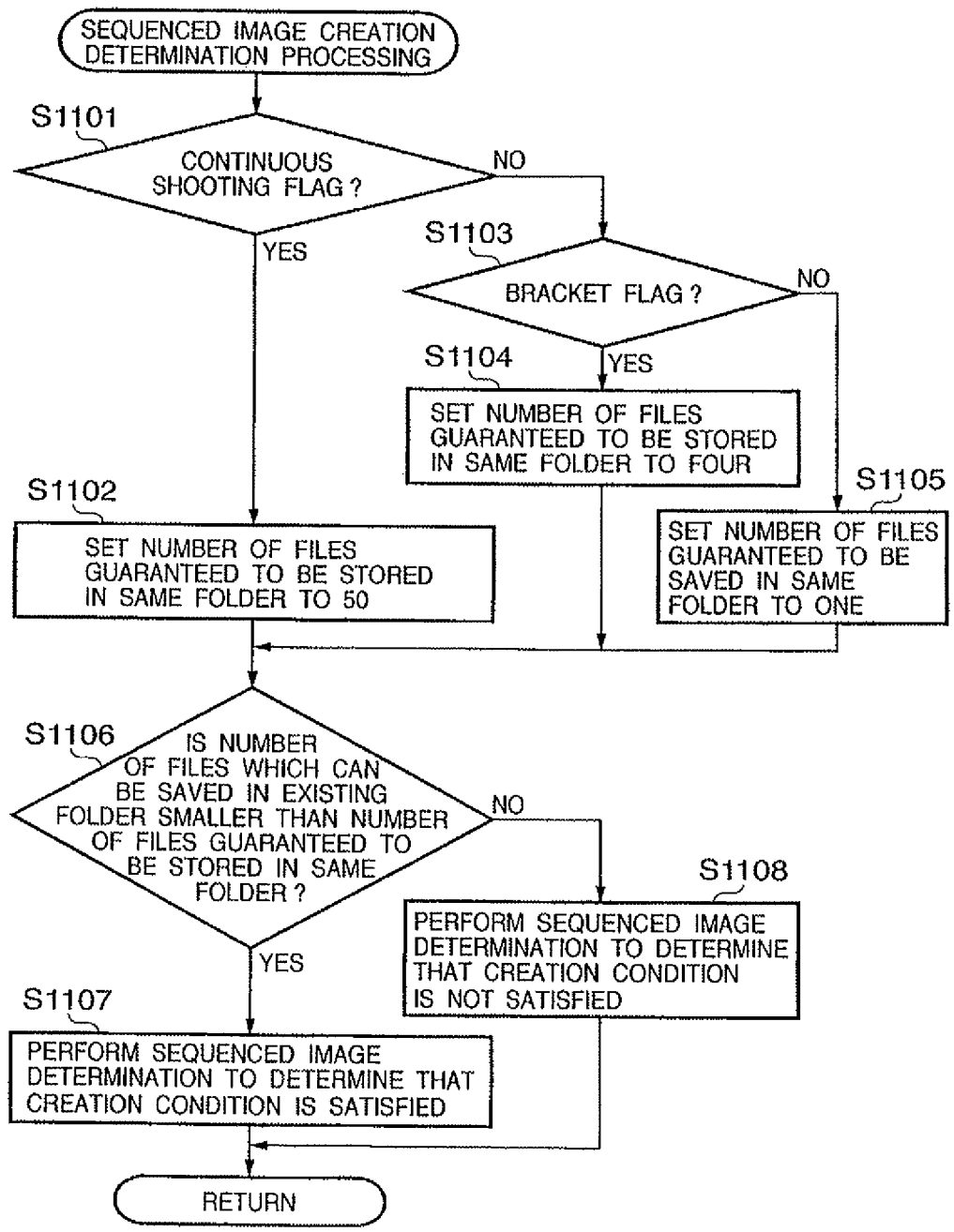
FIG. 11 is a flowchart for explaining the details of sequenced image creation determination processing in step S905 in FIG. 9.

FIG. 11 is a flowchart for explaining the details of the sequenced image creation determination processing in step S905 in FIG. 9.

First of all, it is checked whether the current shooting mode is the continuous shooting mode (S1101). If the current shooting mode is the continuous shooting mode, the number of a series of image files created by continuous shooting and guaranteed to be stored in the same folder is set. In this embodiment, for example, this number is set to 50.

If the current shooting mode is not the continuous shooting mode, it is checked in step S1103 whether the current shooting mode is the bracket mode. The bracket mode is a mode of photographing several images while changing shooting conditions (e.g., exposure and white balance). If the current shooting mode is the bracket mode, the number of a series of image files created by auto bracketing and guaranteed to be stored in the same folder is set in step S1104. In this embodiment, for example, this number is set to four.

If it is determined that the current mode is neither the continuous shooting mode nor the bracket mode, it is determined that the current shooting mode is the normal single shot mode, and the number of image files guaranteed to be stored in the same folder is set. In this embodiment, for example, this number is set to one (S1105).

It is then checked whether the number of files that can be stored in an existing folder in the recording medium 200 or 210 is equal to or more than the number of files guaranteed to be stored in the same folder which is set in step S1102, S1104, or S1105 (S1106). The number of files that can be stored in an existing folder can be obtained from, for example, the upper limit of the number of files in the folder or the DCF file number of the latest image in the folder. If, for example, the upper limit of the number of files in the folder is set, this number can be obtained as the difference between the number of existing files and the upper limit value or the difference between the DCF file number of the latest image and the upper limit of DCF file numbers, which is 9999.

If it is determined that the number of files that can be stored in an existing folder is less than the number of files guaranteed to be stored, it is determined by sequenced image determination that the new folder creation condition is satisfied (S1107). The processing is then terminated. If it is determined that the number of files that can be stored in an existing folder is equal to or more than the number of files guaranteed to be stored in the same folder, it is determined by sequenced image determination that the new folder creation condition is not satisfied (S1108).

As described above, if it is determined in accordance with each condition that a predetermined number of files to be guaranteed to be recorded in the same folder cannot be stored in an existing folder, it is determined by sequenced image determination that the new folder creation condition holds. Therefore, in the subsequent shooting processing, a new folder is created, and the number of pickuped image files guaranteed to be stored in the same folder can be recorded in the new folder.

(File Management Processing)

Figure 12:
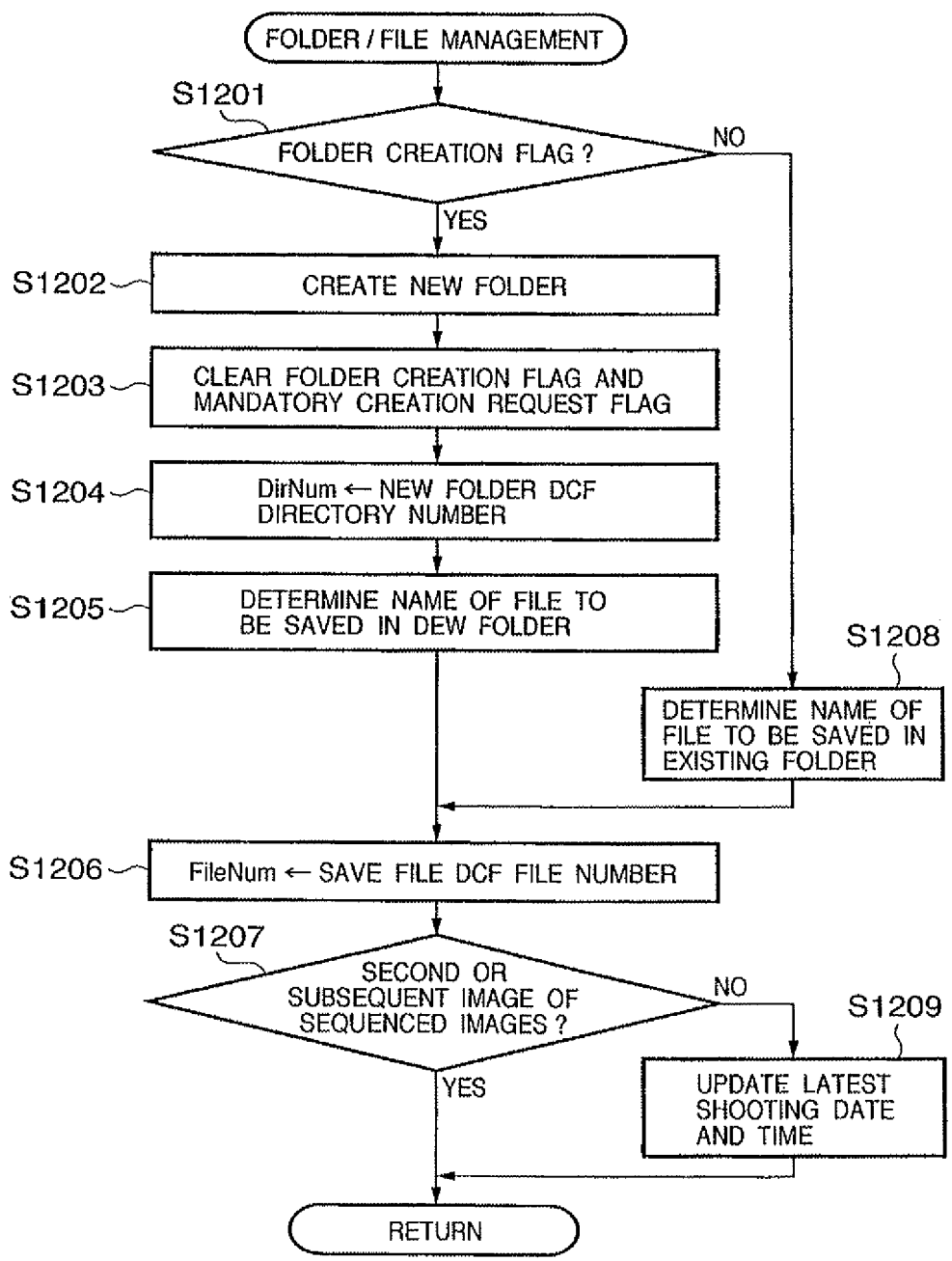
FIG. 12 is a flowchart for explaining the details of folder/file management processing in step S125 in FIG. 3.

FIG. 12 is a flowchart for explaining the details of folder/file management processing in step S125 in FIG. 3.

First of all, it is checked whether the folder creation flag stored in the internal memory or the memory 52 in the system control circuit 50 is set (S1201). If it is determined that the flag is not set in neither of the memories, the name of a file to be stored in an existing folder having a DCF directory number equal to the value of the variable DirMum is determined in step S1208.

If the folder creation flag is set, a new folder is created (S1202). The folder creation flag stored in the internal memory or the memory 52 in the system control circuit 50 and the mandatory creation request flag stored in the nonvolatile memory 56 or the like are cleared (S1203). This prevents redundant creation of folders. In addition, even if the date changes during shooting after the second image at the time of sequenced image shooting such as continuous shooting or auto bracketing, and the folder creation condition is satisfied, no new folder is created, and a series of pickuped image files are stored in the same folder. In other words, at the time of sequenced image shooting, a new folder creation request due to a change of date and time is neglected.

In addition, referring to this flag again makes it possible to detect that a folder creation request is cleared, i.e., a folder is created by a shooting. Referring to FIG. 4, in step S402 of the above setting display processing, the indication is updated by referring to this flag. This makes it possible to erase the folder creation indication 28g (FIG. 15), which indicates that new folder creation is set, upon execution of folder creation.

Subsequently, the DCF directory number of the new folder is stored in the variable DirNum (S1204), and the name of a file to be stored in the new folder is determined (S1205). Assume that the DCF directory number of the new folder has the value obtained by adding one to the DCF directory number of the folder in which the latent image is stored. In addition, assume that of the file name stored in the new folder, the initial value of the file number is 0001. Assume also that the upper four characters of the file name is a character string set in the digital camera 100 in advance.

If a storage file name is determined, the DCF file number of the storage file is stored in the variable FileNum (S1206).

Update processing for the latest shooting date and time is then performed. In step S1207, it is checked whether this pickuped image is the second or subsequent image of the sequenced images. If the pickuped image is not the second or subsequent image of the sequenced images, i.e., the image pickuped in the single shot mode (single shooting) or the first image of sequenced images obtained by continuous shooting or the like, the current date and time at the time of a shooting are stored as latest shooting date and time in the nonvolatile memory 56 or the like.

The latest shooting date and time are used again for date and time change determination described with reference to FIG. 10. In this embodiment, the latest shooting date and time are updated only when single shooting is performed or the pickuped image is the first image of sequenced images obtained by continuous shooting or the like, in order to increase the probability at which it is determined that there is a change of date and time in the date and time change determination in FIG. 10 at the time of a shooting after a sequenced image shooting, in particular.

That is, in a sequenced image shooting, the latest shooting date and time are not updated at the time of a shooting of the second or subsequent image, and hence the shooting date and time of the first image of sequenced images are maintained as the latest shooting date and time after the sequenced image shooting. As a consequence, at the time of a next shooting, the difference between the latest shooting date and time and the current date and time becomes larger than the actual difference. This promotes the creation of a new folder when a new folder creation request due to a change of date and time is set. With this operation, a pickuped file of sequenced images and a subsequent pickuped file tend to be stored in different folders, thus facilitating organization of pickuped image files afterwards.

However, this control is not essential, and the latest shooting date and time may be updated for every shooting. In addition, the embodiment may be configured to allow the user to arbitrarily select whether to update the latest shooting date and time.

(Shooting Condition Setting Processing)

Figure 13:
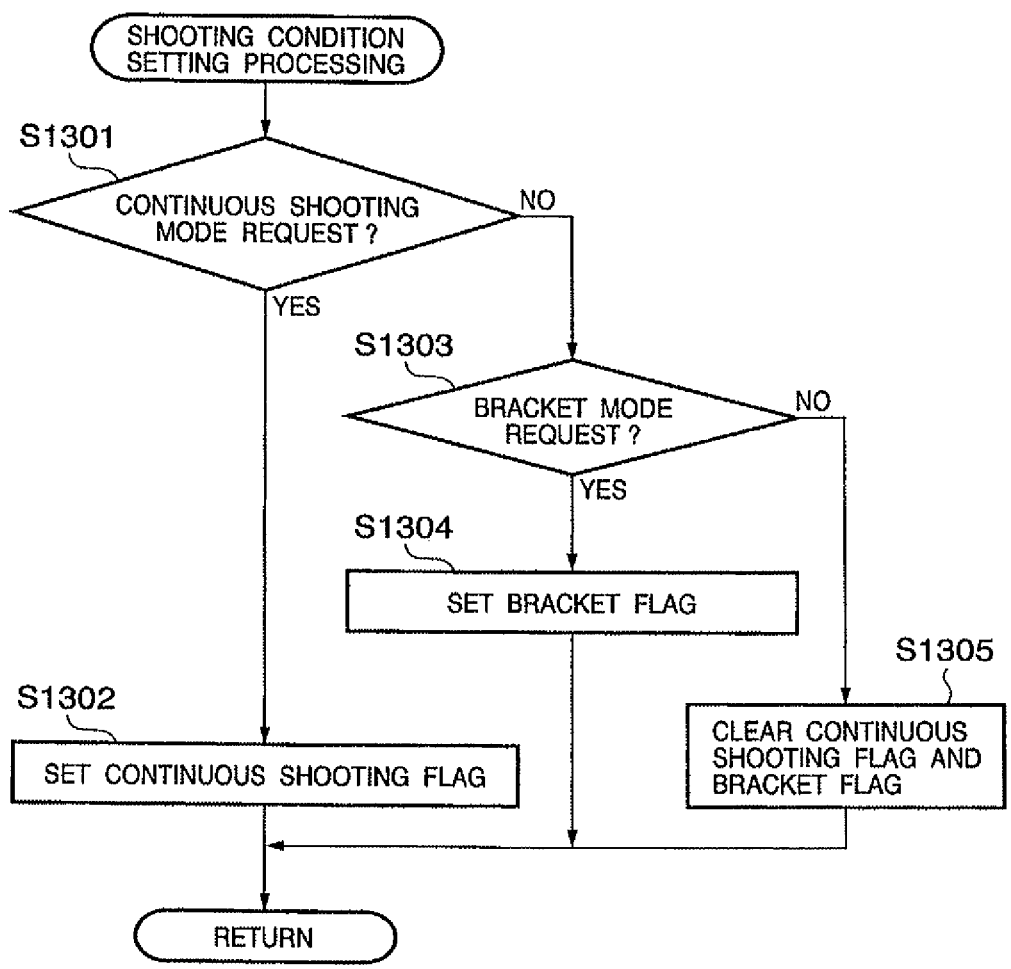
FIG. 13 is a flowchart for explaining the details of shooting condition setting processing in step S108 in FIG. 2.

FIG. 13 is a flowchart for explaining the details of the shooting condition setting processing in step S108 in FIG. 2.

First of all, it is checked whether the mode dial 60 is at the position of the continuous shooting mode (S1301). If the dial is at the position of the continuous shooting mode, the system control circuit 50 sets a continuous shooting flag indicating that the current shooting mode is the continuous shooting mode in the internal memory or the memory 52 (S1302), and terminates the processing.

If the mode dial 60 is not at the position of the continuous shooting mode, it is checked in step S1303 whether the dial is at the position of the bracket mode. If the dial is at the position of the bracket mode, the system control circuit 50 sets a bracket flag indicating that the current shooting mode is auto bracketing in the internal memory or the memory 52 (S1304), and terminates the processing.

If the mode dial 60 is not located at either the position of the continuous shooting mode or the position of the bracket mode, the system control circuit 50 clears both the continuous shooting flag and the bracket flag stored in the internal memory or the memory 52 (S1305). The processing is then terminated.

As described above, according to this embodiment, since a new folder is automatically created in accordance with settings and a pickuped image file is stored in the new folder, there is no need to create a new folder for every shooting. This improves high operability.

In addition, since a new folder is created after a shooting instruction is actually issued, a recording medium can be replaced without any problem. That is, this solves the conventional problems that a folder created in advance is left unused, and a created folder cannot be found.

Since each user can select and set conditions for the automatic creation of a new folder from a plurality of types of conditions, pickuped image files can be automatically classified in accordance with the requirement of each user.

Since whether conditions for automatic creation are satisfied is determined on the basis of the latest shooting date and time and the shooting date and time of a next pickuped image, a change of any unit (e.g., year, month, week, and day) can be determined by common processing. Even with a change of automatic creation conditions, therefore, proper determination can be performed.

If an automatic creation condition is a date and time change factor, an offset time can be set with respect to the determination condition. This makes it possible to create a new folder in accordance with the situation and requirement of each user.

Since the latest shooting date and time are the shooting date and time of the latest image in a recording medium or the date and time when the latest shooting was performed by the image processing apparatus, even if the recording medium is replaced, proper reference date and time information (comparison target) can be acquired.

Storing the shooting date and time of the latest image in a recording medium makes it possible to determine whether to create a folder without rechecking the recording medium when, for example, the image processing apparatus is activated. This makes it possible to quickly start subsequent shooting processing.

Since the stored latest shooting date and time and/or the shooting date and time of the latest image in a recording medium are updated when the recording medium is replaced and/or a new, shooting is performed, a check in the recording medium and storage in the image processing apparatus can be performed with a minimum number of operations. In addition, information inconsistency can be prevented.

Since a setting can be made to unconditionally create a new folder at the time of a next shooting independently of condition setting for automatic creation, various requirements of the user can be met. Providing an arrangement which allows setting with one touch like the new folder creation request button 74 makes it possible to cope with the requirement that an instruction to create a folder be issued immediately before a shooting. This provides high convenience.

If no new folder as a storage designation cannot be created, a file is stored in an existing folder. This can prevent the situation in which a pickuped image file cannot be recorded.

When a file cannot be additionally stored in an existing folder as a save destination, a new folder is created, and the pickuped image file is stored in the new folder. This therefore can prevent the situation in which the pickuped image file cannot be recorded.

When a series of a plurality of pickuped image (sequenced images) files which are obtained by continuous shooting, auto bracketing, or the like are required to be handled as one group, a new folder is created depending on whether a predetermined number of files can be stored in an existing folder. With this operation, even if the existing folder is set as a save destination, a series of pickuped image files can be reliably stored in the same folder.

In addition, since a user is notified whether a new folder, is created at the time of a next shooting, the user can confirm that a folder is created. Since a preset condition cannot be always satisfied immediately, it is important that the user can know whether the set condition is properly recognized and executed. Furthermore, since the user can know the creation of a new folder in advance, the user can change a setting so as to, for example, cancel a folder creation reservation as needed at the time of reception of a notification, and can, flexibly construct a desired folder structure.

Even when the image processing apparatus automatically changes a storage folder for a pickuped image to a new folder, the user can know it. This allows the user to grasp an image to be stored first in the new folder and easily search for an image after a shooting.

In addition, since a new folder is created regardless of whether a new folder creation request due to a change of date and time is issued during a sequenced image shooting, even if the new folder creation request due to a change of date and time is satisfied, it will never occur that sequenced images will be saved in a plurality of folders.

In a shooting in the single shot mode, a shooting time is regarded as the latest shooting date and time. In the sequenced image shooting mode, the shooting time of the first image is regarded as the latest shooting date and time. With this, when a change of date and time as a new folder creation factor occurs during a sequenced image shooting, a pickuped image file is reliably stored in a new folder at the time of a next shooting.

Assume that the latest image file in a recording medium is determined as a pickuped image in the single shot mode. In this case, if the shooting time of this image is determined as part of sequenced images, the shooting time of the first image of the sequenced images is used as the latest shooting date and time in the recording medium. With this operation, even if an image stored in the recording medium is an image obtained when a change of date and time as a folder switching factor has occurred during a sequenced image shooting, a pickuped image file can be reliably stored in a new folder at the time of a next shooting.

Furthermore, older date and time of the latest shooting date and time held in the image processing apparatus and the shooting date and time of the latest image data in the recording medium are used as the latest shooting date and time in the determination of the necessity of new folder creation. This makes it possible to perform proper determination even if a plurality of recording media are used.

<<Second Embodiment>>

The operation of a digital camera as an example of an image processing apparatus according to the second embodiment of the present invention will be described with reference to FIGS. 3, 5 to 13, 15, 16, 17, and 23.

Assuming that the digital camera of this embodiment also has the functional arrangement shown in FIG. 1 like the digital camera 100 described in the first embodiment, this digital camera will be described below as a digital camera 100.

The overall operation of the digital camera 100 will be described first with reference to the flowcharts of FIGS. 23 and 3.

When the power supply is turned on upon battery change or the like, a system control circuit 50 initializes flags, control variables, and the like (S2301). After the immediately preceding mode name stored in the internal memory or a memory 52 in the system control circuit 50 is set to "activation" (S2302), file search processing in the recording medium is performed (S2303).

Figure 23:
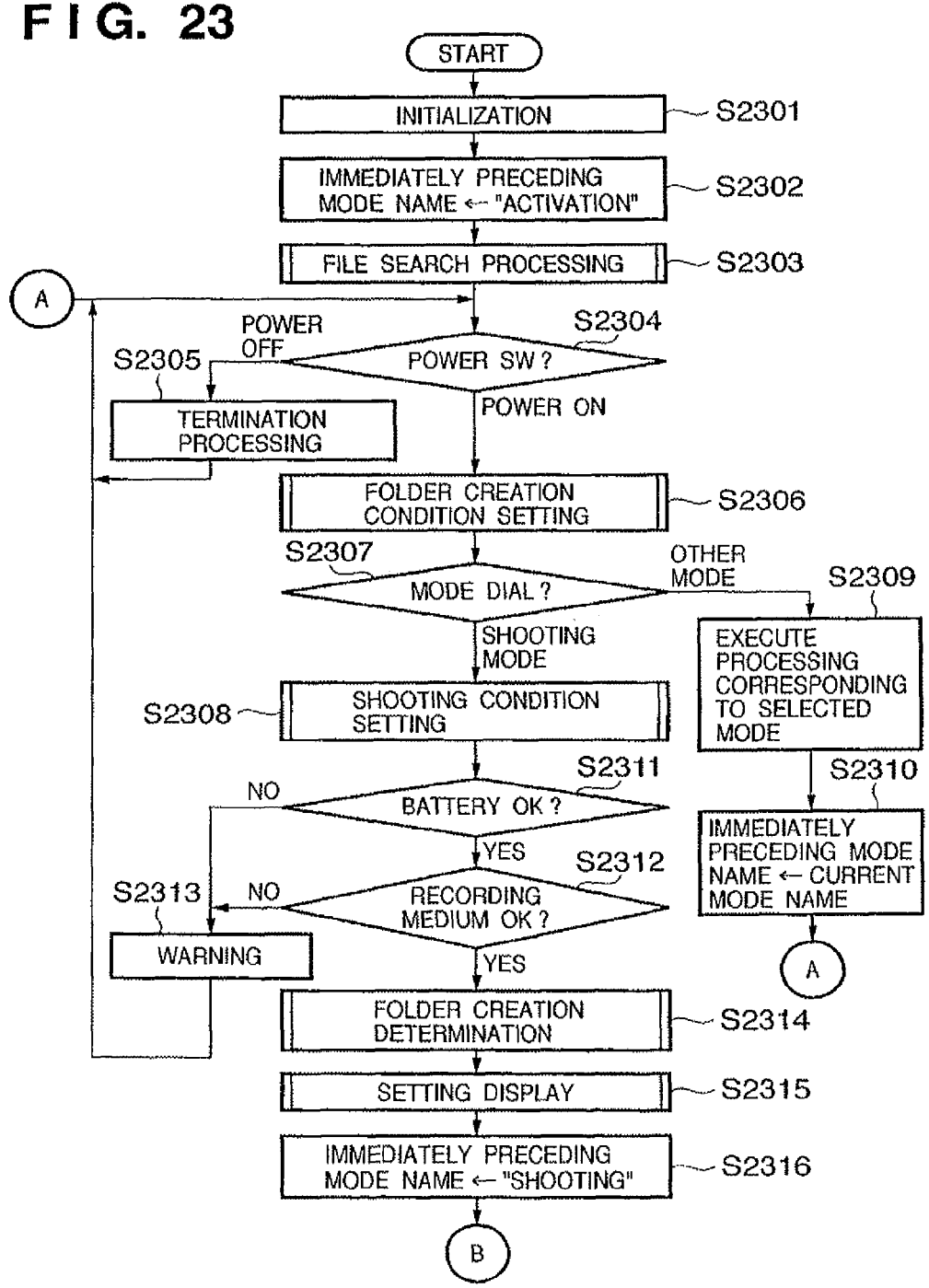
FIG. 23 is a flowchart for explaining part of the overall operation of the digital camera 100 according to the second embodiment of the present invention.

The details of the file search processing in step S2303 in FIG. 23 are the same as those described with reference to FIG. 7.

The system control circuit 50 determines the set position of a power switch 72 (S2304). If the power switch 72 is set OFF, the flow advances to step S2305 to perform predetermined termination processing. Termination processing includes, for example, the following processing. The display state of each display unit is changed to the terminated state, and a barrier 102 is closed to protect the image pickup unit. The flags, the parameters including control variables and the like, the set values, and the set mode are recorded in a nonvolatile memory 56. A power control unit 80 interrupts power to portions to which power need not be supplied, including an image display unit 28. When the termination processing is complete, the flow returns to step S2304.

If it is determined in step S2304 that the power switch 72 is set ON, the system control circuit 50 sets folder creation conditions (S2306). The details of the folder creation condition setting processing are the same as those described with reference to FIG. 8.

The system control circuit 50 determines the set position of a mode dial 60 (S2307). If the mode dial 60 is set to the shooting mode, shooting conditions are set (S2308). The flow then advances to step S2311. The details of the shooting condition setting processing in step S2308 are the same as those described with reference to FIG. 13.

If it is determined in step S2307 that the mode dial 60 is set to another mode, the system control circuit 50 executes processing corresponding to the selected mode (S2309). When the processing is complete, the immediately preceding mode name stored in the internal memory or the memory 52 in the system control circuit 50 is set to the current mode name (S2310). The flow then returns to step S2304.

In step S2311, the system control circuit 50 determines the remaining capacity or operation state of a power supply 86 comprising a battery and the like by using the power control unit 80. If the system control circuit 50 determines that the state of the power supply 86 poses a problem in terms of the operation of the digital camera 100, the system control circuit 50 issues a predetermined warning corresponding to the problem with an image or sound by using the display unit 54 (S2313). The flow then returns to step S2304.

If it is determined that there is no problem in the power supply 86, the system control circuit 50 checks the recording medium in step S2312. That is, the attachment/detachment of a recording medium 200 or 210 is determined, and management information of image files recorded in the attached recording medium is acquired. In this process, it is determined whether there is a problem in terms of recording/playing back operation with respect to a recording medium. This problem is, for example, that neither the recording media 200 and 210 are attached or normal read/write operation cannot be performed. If there is some kind of problem, a predetermined warning corresponding to the problem is issued with an image or sound by the display unit 54 (S2313). The flow then returns to step S2304.

If it is determined in step S2312 that there is no problem in the recording medium, the system control circuit 50 determines whether to create a new folder for storing a pickuped image file to be created by a next shooting (S2314). The details of this folder creation determination processing are the same as those described with reference to FIG. 9. The details of the date and time creation determination processing in step S903 in FIG. 9 are the same as those described with reference to FIG. 10. The details of the sequenced image creation determination processing in step S905 in FIG. 9 are the same as those described with reference to FIG. 11.

The system control circuit 50 then displays various setting states in the digital camera 100 with images or sounds by using the display unit 54 (S2315). If the image display unit 28 is set ON, the image display unit 28 is also used to display various setting states in the digital camera 100 with images or sounds. The details of this setting display processing will be described later with reference to FIG. 16.

Subsequently, the system control circuit 50 sets the immediately preceding mode name stored in the internal memory or the memory 52 in the system control circuit 50 to "shooting" (S2316). The flow then advances to step S121 in FIG. 3. The details of the digital camera 100 are the same as those described with reference to FIG. 3.

The details of the focusing/metering process in step S122 in FIG. 3 are the same as those described with reference to FIG. 5.

The details of the folder/file management processing in step S125 in FIG. 3 are the same as those described with reference to FIG. 12.

The details of the shooting processing in step S126 in FIG. 3 are the same as those described with reference to FIG. 6.

(Setting Display Processing)

Figure 16:
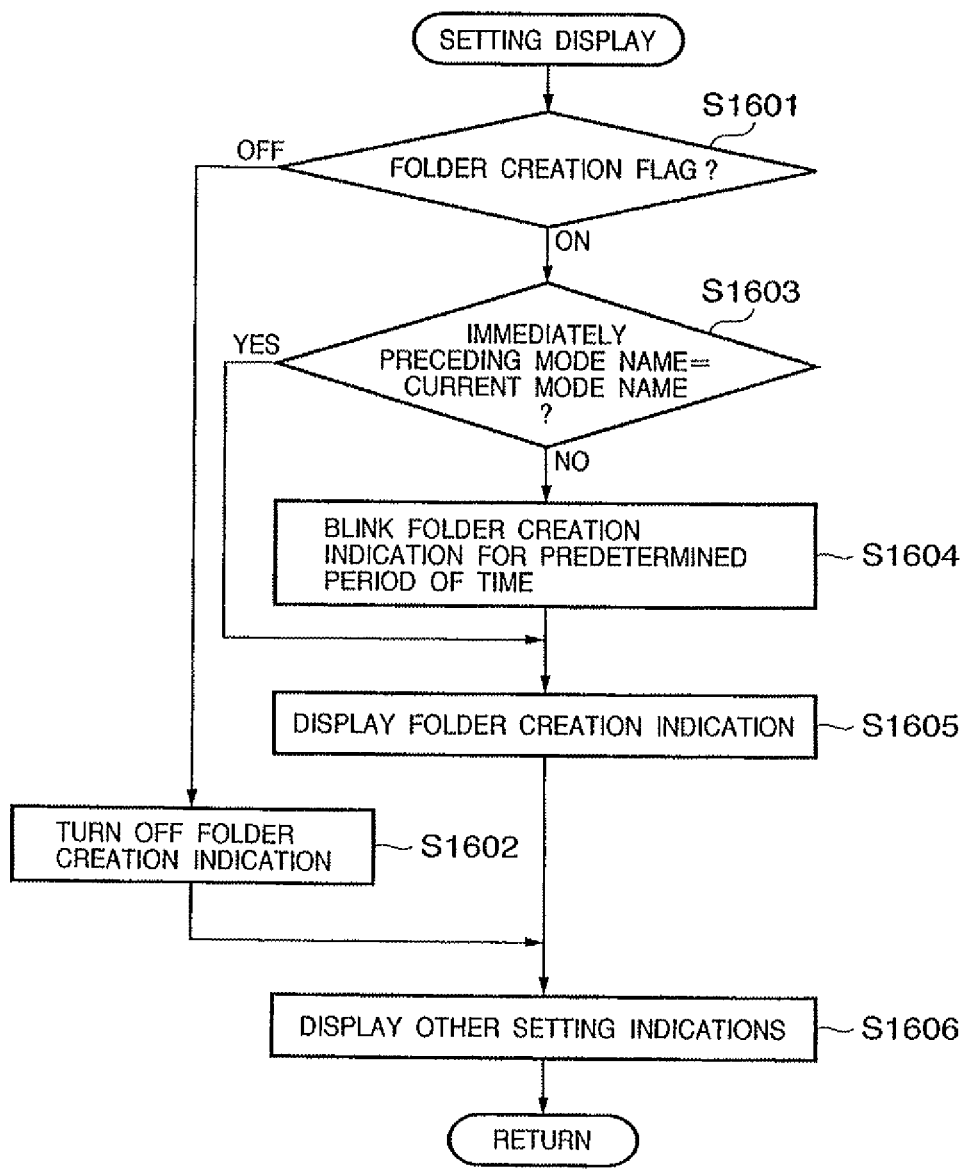
FIG. 16 is a flowchart for explaining the details of setting display processing in a digital camera according to the second embodiment of the present invention.

FIG. 16 is a flowchart showing the details of the setting display processing in step S2315 in FIG. 23.

First of all, in step S1601, the system control circuit 50 determines the state of a folder creation flag stored in the internal memory or the memory 52 in the system control circuit 50. If the folder creation flag is cleared, the folder creation indications on the display unit 54 and image display unit 28 are turned off (S1602). The flow then advances to step S1606.

If the folder creation flag is set, the system control circuit 50 determines whether the immediately preceding mode name stored in the internal memory or the memory 52 coincides with the current mode name (S1603). If it is determined that they coincide with each other, the flow advances to step S1605. Otherwise, the flow advances to step S1604.

Figure 17:
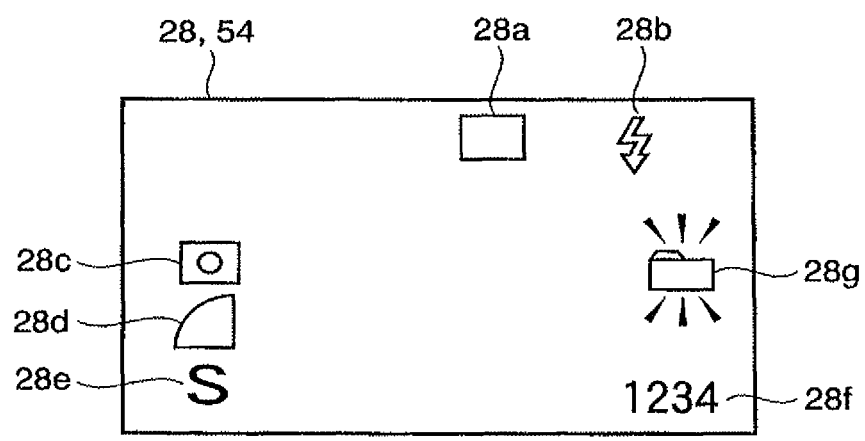
FIG. 17 is a view showing an example of display performed by the digital camera according to the second embodiment of the present invention in setting display processing.

In step S1604, the system control circuit 50 blinks folder creation indications in a predetermined period of time by using the display unit 54 and the image display unit 28 (S1604). FIG. 17 shows an example of display performed by the display unit 54 and the image display unit 28. FIG. 17 shows a state wherein various setting states in the digital camera 100 are already displayed in addition to a folder creation indication.

As shown in FIG. 17, only the folder creation indication 28*g* is blinked, and various setting indications in the digital camera 100 other than the folder creation indication 28*g* are displayed. Referring to FIG. 17, the various setting states include a single shot/continuous shooting indication 28*a*, a flash indication 28*b*, a metering scheme indication 28*c*, a compression ratio Indication 28*d*, an indication of the number of recording pixels 28*e*, and an indication of the number of remaining shootable images 28*f*.

Blinking only the folder creation indication 28*g* highlights the folder creation indication 28*g* which tends to be overlooked among other setting indications 28*a* to 28*f* at the time of mode switching. In step S2302 in FIG. 23, in particular, the immediately preceding mode name is set to "activation" at the time of activation. In setting display processing in step S2315 immediately after activation, the immediately preceding mode name is set to "activation", and the current mode name is set to "shooting". Therefore, even at the time of activation, the folder creation indication is highlighted by blinking.

In step S1605, the system control circuit 50 displays the folder creation indication 28*g* with an image or sound by using the display unit 54 and the image display unit 28. That is, the folder creation indication 28*g* is blinked. If the folder creation indication is blinked in step S1604, blinking of the folder creation indication is switched to displaying. An example of display performed by the display unit 54 and the image display unit 28 in step S1605 is the same as that shown in FIG. 15. Like FIG. 17, FIG. 15 shows a state wherein various setting indications in the digital camera 100 are displayed in addition to the folder creation indication. Like various setting state indications 28*g* to 28*f* in the digital camera 100 in addition to the folder creation indication, the folder creation indication 28*g* is displayed.

The system control circuit 50 displays (displays/updates) various setting states in the digital camera 100 in addition to the folder creation indication with images or sounds by using the display unit 54 (S1606), and terminates the setting display processing.

As described above, in the second embodiment, at the time of activation or mode switching, the folder creation indication which tends to be overlooked among other setting indications is highlighted (blinked). This makes it possible to reliably notify the user of the creation of a new folder at the time of a next shooting.

In the above description, blinking operation has been exemplified as highlighting operation. However, other highlighting methods, e.g., changing a display color to a more conspicuous color and increasing a display size, may be used.

<<Third Embodiment>>

The operation of a digital camera as an example of an image processing apparatus according to the third embodiment of the present invention will be described with reference to FIGS. 2, 3, 5 to 13, 15, 18, and 19.

Assuming that the digital camera of this embodiment also has the functional arrangement shown in FIG. 1 like the digital camera 100 described in the first embodiment, this digital camera will be described below as a digital camera 100.

The operation of the digital camera 100 according to the third embodiment is the same as that of the first embodiment except for the folder creation determination processing in step S112 in FIG. 2 and the setting display processing in step S113, and hence only processing characteristic to this embodiment will be described below.

This embodiment is characterized in that when a folder creation flag is set in the folder creation determination processing executed in step S112 in FIG. 2, more specifically in step S907 in FIG. 9, information indicating which condition is satisfied when the flag is set is also stored. That is, information indicating whether the flag is set due to a mandatory creation request, date and time creation determination, or sequenced image creation determination is stored in the internal memory or a memory 52. The folder creation flag itself may be provided with information indicating a setting factor.

Figure 18:
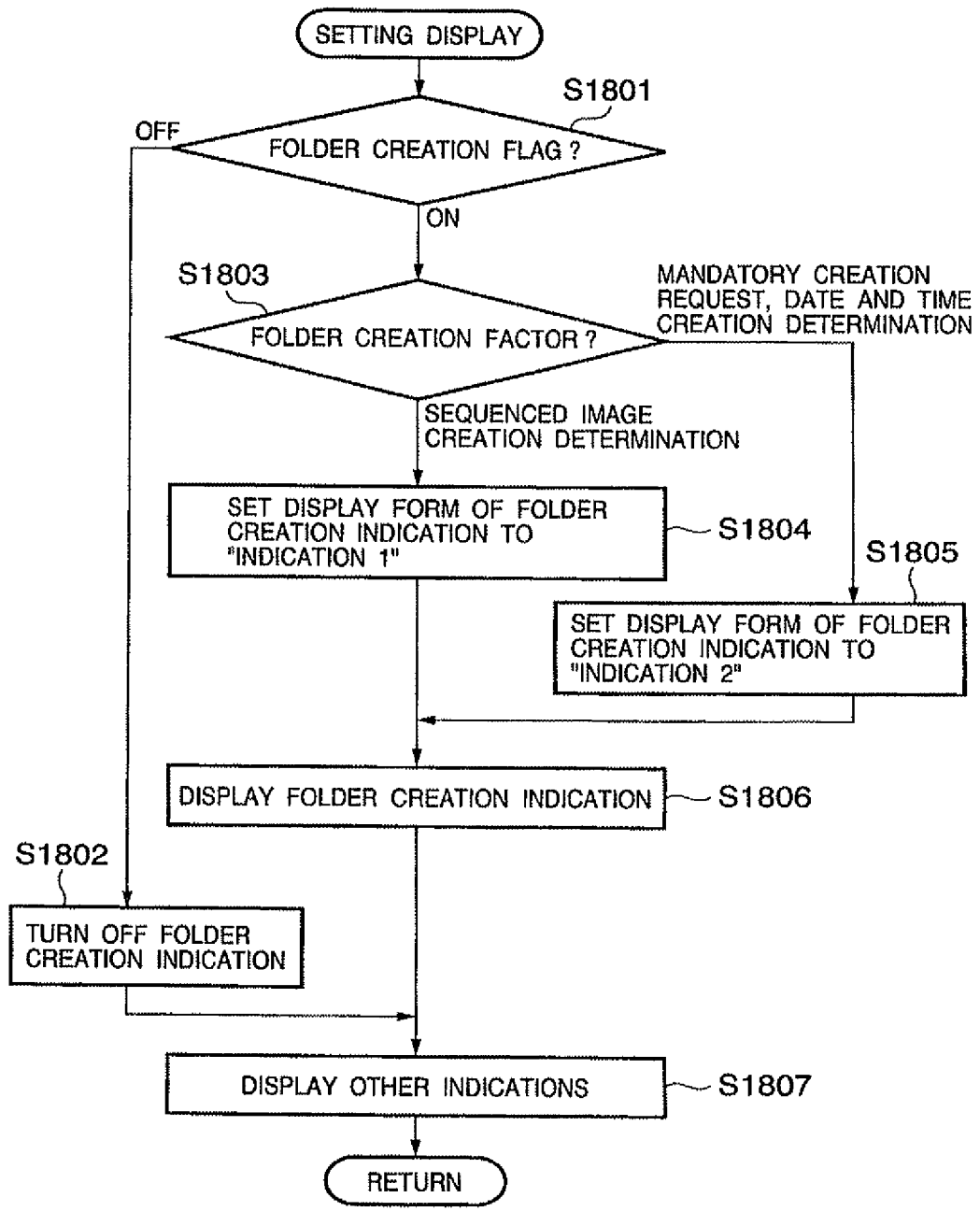
FIG. 18 is a flowchart for explaining the details of setting display processing in a digital camera according to the third embodiment of the present invention.

FIG. 18 is a flowchart for explaining the details of processing executed by the digital camera 100 according to this embodiment as the setting display processing in step S113 in FIG. 2.

First of all, a system control circuit 50 determines the state of the folder creation flag stored in the internal memory or the memory 52 (S1801). If the folder creation flag is cleared, the folder creation indications on a display unit 54 and image display unit 28 are turned off (S1802). The flow then advances to step S1807.

If the folder creation flag is set, the system control circuit 50 determines a folder creation factor in accordance with information stored in the internal memory or the memory 52 (S1803). When a folder is to be created when a creation condition is satisfied in sequenced image creation determination, the folder creation indication form is set to "indication 1" (S1804). For example, the folder creation indication is set to the graying out of a folder icon. Graying out indicates that the user cannot stop folder creation.

If a folder is to be created when a mandatory creation request is issued by a user or a creation condition is met in date and time creation determination, the folder creation display form is set to "indication 2" (S1805). For example, the folder creation indication is set to a normal indication of a folder icon. Assume that "indication 1" and "indication 2" are displayed in different display forms.

The system control circuit 50 displays a folder creation indication with an image or sound by using the display unit 54 or the image display unit 28 (S1806). In this case, a folder creation indication is displayed in accordance with the display form set in step S1804 or S1805. An example of display on the display unit 54 and image display unit 28 in step S1806 in a case wherein the normal display of a folder icon is set to a folder creation indication in step S1805 is the same as that shown in FIG. 15. Note, however, that in the case shown in FIG. 15, various setting states in the digital camera 100 are already displayed in addition to the folder creation indication. FIG. 15 shows display in a case wherein a new folder is to be created by user's setting. The user can stop the creation of a new folder as needed by setting a folder creation condition.

Figure 19:
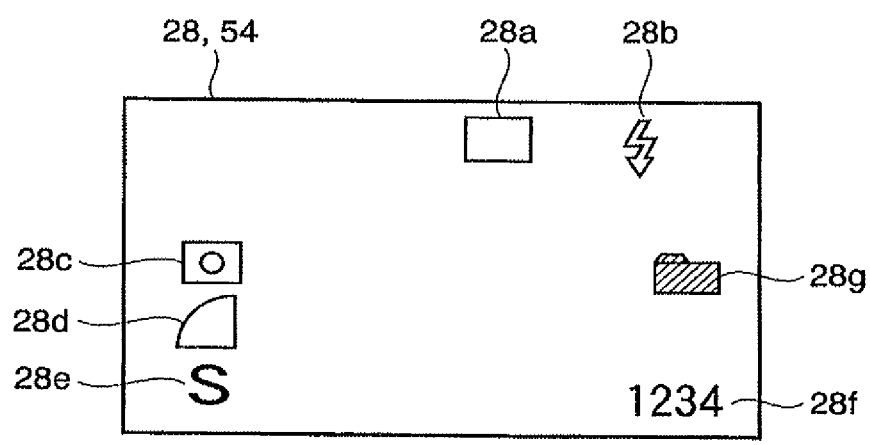
FIG. 19 is a view showing an example of display performed by the digital camera according to the third embodiment of the present invention in setting display processing.

FIG. 19 shows an example of display performed by the display unit 54 and the image display unit 28 in step S1806 when "indication 1" form is set in step S1804. Like FIG. 15, FIG. 19 shows a case wherein various setting states in the digital camera 100 have already been displayed in addition to the folder creation indication. Referring to FIG. 19, various setting states 28*a* to 28*f* in the digital camera 100 are displayed in addition to the folder creation indication, and the folder icon is grayed out 28*g*. FIG. 19 shows display in a case wherein a folder is mandatorily created by the camera owing to the maximum number of images that can be recorded per folder. The grayed-out indication indicates that the creation of a new folder cannot be stopped.

The system control circuit 50 displays (displays/updates) various setting states in the digital camera 100 in addition to the folder creation indication with images or sounds by using the display unit 54 (S1807). The setting display processing is then terminated.

As described above, according to this embodiment, the display form of the folder creation indication is changed depending on a folder creation factor. This makes it possible to not only notify the user whether a new folder is to be increased at the time of a next shooting but also notify the user whether the user can stop the creation of a folder. This can therefore prevent the user from uselessly tracking the menu hierarchy to cancel the folder creation setting in spite of a state wherein the user cannot stop the creation of a folder.

<<Fourth Embodiment>>

The operation of a digital camera as an example of an image processing apparatus according to the fourth embodiment of the present invention will be described with reference to FIGS. 2, 3, 5 to 13, 20, 21, and 22.

Assuming that the digital camera of this embodiment also has the functional arrangement shown in FIG. 1 like the digital camera 100 described in the first embodiment, this digital camera will be described below as a digital camera 100.

The operation of the digital camera 100 according to the fourth embodiment is the same as that of the first embodiment except for the setting display processing in step S113 in FIG. 2, and hence only processing characteristic to this embodiment will be described below.

Figure 20:
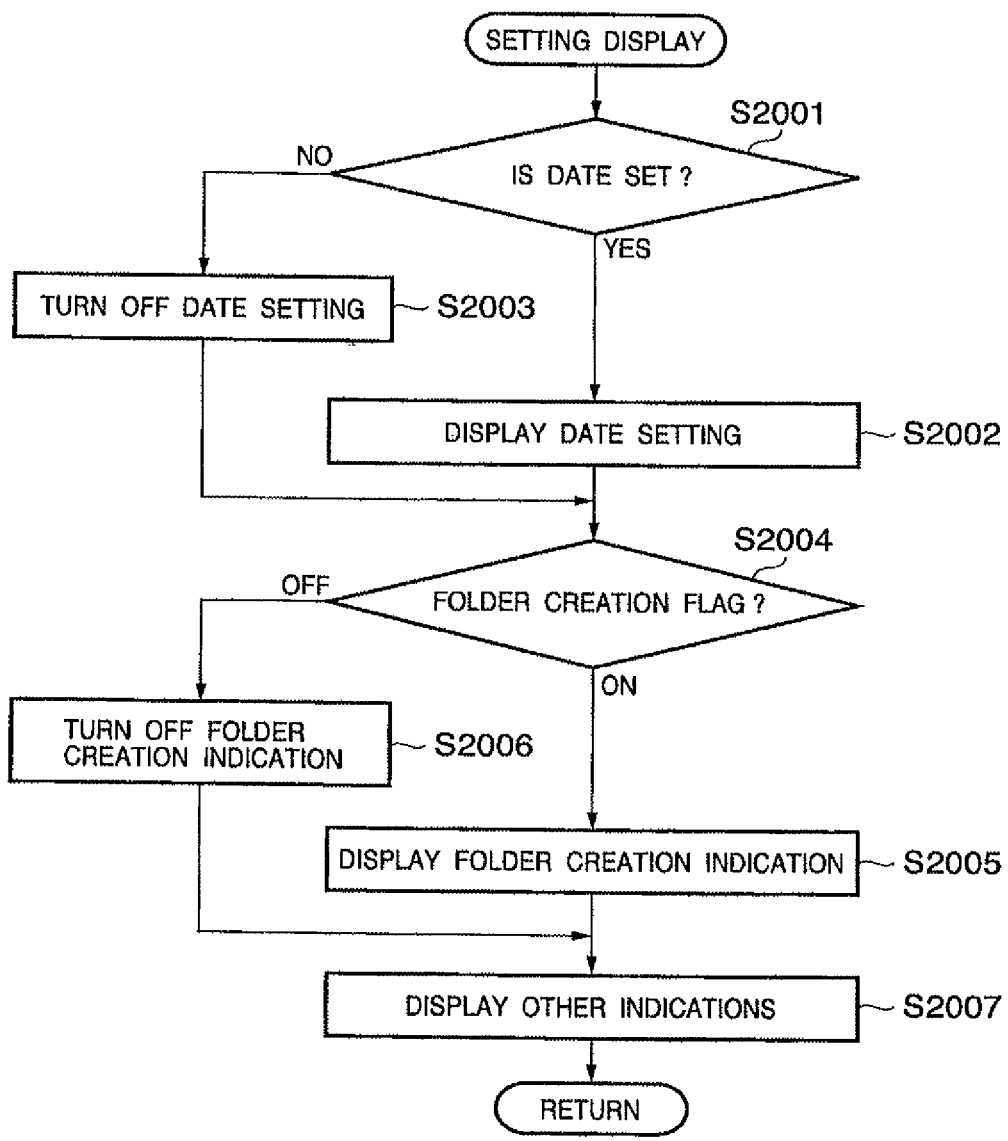
FIG. 20 is a flowchart for explaining the details of setting display processing in a digital camera according to the fourth embodiment of the present invention.

FIG. 20 is a flowchart for explaining the details of processing executed by the digital camera 100 according, to this embodiment as the setting display processing in step S113 in FIG. 2.

First of all, a system control circuit 50 determines whether folder creation due to a change of date and time is set (S2001). If folder creation due to a change of date and time is set (S2001), the set date and time change factor (i.e., a folder creation condition) is displayed on a display unit 54 or an image display unit 28. (S2002). The flow then advances to step S2004.

FIG. 21 is an example of display performed by the display unit 54 and the image display unit 28 in step S2002. FIG. 21 shows a state wherein a folder creation flag is cleared, i.e., the date and time at which folder creation was reserved are not reached. FIG. 21 shows a state wherein various setting states in the digital camera 100 have already been displayed in addition to the folder creation indication.

In the case shown in FIG. 21, various setting states 28*a* to 28*f* in the digital camera 100 are displayed in addition to the folder creation indication, and a date and time change factor (date setting: "everyday at 0:00" in this case) set as a folder creation condition is displayed. Displaying the set folder creation condition allows the user to recognize that the folder creation condition is properly set before a new folder is actually created. This can therefore suppress the occurrence of setting errors and gives the user a sense of security.

If it is determined in step S2001 that no folder creation reservation due to a change of date and time is set, the folder creation indications on the display unit 54 and the image display unit 28 are turned off (82003). The flow then advances to step S2004.

In step S2004, the system control circuit 50 determines the state of the folder creation flag stored in the internal memory or the memory 52. If the folder creation flag is set, the folder creation indications are displayed on the display unit 54 and the image display unit 28 (S2005). The flow then advances to step S2007.

FIG. 22 shows an example of display performed by the display unit 54 and the image display unit 28. In the case shown in FIG. 22, folder creation due to a change of date and time is set, and various setting states in the digital camera 100 are displayed in addition to the folder creation indication. As is obvious from FIG. 22, the folder creation indication 28*g* is displayed together with the setting indication 28*h* due to a change of date and time as a folder creation condition and various setting states 28*a* to 28*f* in the digital camera 100 other than the folder creation indication. Therefore, the user can recognize that the folder creation condition is properly set, and a new folder is created at the time of a next shooting.

If it is determined in step S2004 that the folder creation flag is cleared, the system control circuit 50 turns off the folder creation indications on the display unit 54 and the image display unit 28 (S2006). The flow then advances to step S2007.

In step S2007, the system control circuit 50 displays (displays/updates) various setting states in the digital camera 100 other than the folder creation flag with images or sounds by using the display unit 54, and terminates the setting display processing.

As described above, according to this embodiment, if folder creation due to a change of date and time is set, the setting content (folder creation condition) is displayed. This allows the user to recognize that the folder creation condition is properly set before a new folder is actually created. This suppresses the occurrence of setting errors and gives the user a sense of security.

<<Other Embodiment>>

In the display example in each embodiment described above, a folder icon is used as the folder creation indication 28*g*. However, this indication may be displayed in other forms, e.g., a form using characters. Alternatively, the user may be notified with a sound message concurrently with or instead of the display of the indication. Furthermore, still another means may be used as long as it is a notification means which can notify the user of the creation of a new folder at the time of a next shooting.

If the image processing apparatus includes no display device capable of displaying icons, characters, and the like or a display unit capable of displaying icons, characters, and the like in accordance with settings and the like is OFF, another method can be used. For example, a folder creation indication may be displayed by turning on/off a simpler display device, e.g., an LED, or may be notified by using a sound. If a through-the-lens image cannot be displayed as in the case of a digital single lens reflex camera, no display may be performed by the display unit, and notification may be performed by using an LED or sound.

Various setting states (for example, 28*a* to 28*f* in FIG. 15) other than the folder creation indication in the digital camera 100 may be OFF depending on user settings. Even in such a case, only a folder creation indication (for example, 28*g* in FIG. 15) may be displayed to reliably notify the user of the creation of a folder. This allows the user to easily grasp the folder creation indication even at the time of activation or mode switching, and hence reduce the necessity to blink/highlight the indication as in the second embodiment.

Each embodiment described above has exemplified still image shooting. However, as the shooting mode in step S106 in FIG. 2, the moving image mode is conceivable as well as the still image mode. In the case of moving image shooting as well, it is obvious that the same effects as those in the case of still image shooting can be obtained by performing folder creation determination processing and setting display processing before a shooting, and turning off the folder creation indication when a new folder is created and a pickuped moving image is stored in it. Although a long shooting time is required for a moving image, since the folder creation indication is displayed until a new folder is actually created and an image is stored in it, the folder creation display is displayed during a shooting.

The recording media 200 and 210 are not limited to memory cards such as PCMCIA cards and compact flash memories, hard disks, and the like, and may comprise optical disks such as micro DATs, magnetooptic disks, CD-Rs, and CD-RWs, phase change type optical disks such as DVDs, and the like.

In addition, the recording media 200 and 210 each may be a composite medium in which a memory card and a hard disk are integrated, or a composite medium including a detachable part.

In the above embodiments, the recording media 200 and 210 have been described as media which can be detached from the digital camera 100 and arbitrarily connected thereto. However, one or both of the recording media may be fixed in the digital camera 100.

Furthermore, the digital camera 100 may be designed to allow a single or an arbitrary number of recording media 200 and 210 to be connected to the camera.

The above embodiments each have exemplified the arrangement in which the recording media 200 and 210 are loaded in the digital camera 100. However, either a single recording medium or any combination of a plurality of recording media may be used.

The present invention may be applied to a system constituted by a plurality of devices or an apparatus comprising a single device.

The object of the present invention is realized even by supplying a storage medium (or a recording medium) storing software program codes for implementing the functions of the above-described embodiments to a system or apparatus, and causing the computer (or a CPU or MPU) of the system or apparatus to read out and execute the program codes stored in the storage medium. In this case, the program codes read out from the storage medium implement the functions of the above-described embodiments by themselves, and the storage medium storing the program codes constitutes the present invention. The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

Note that the present invention may be practiced by combining the above embodiments or their technical elements, as needed.

In addition, the present invention may be designed such that the scope of claims or all or some of the components of the embodiments form one apparatus, may be an apparatus coupled to another apparatus, or may be elements constituting an apparatus.

As described above, according to the present invention, in particular, an image save destination is temporarily set by folder creation condition setting processing (FIG. 8) before a shooting. In folder/file management (FIG. 12), a folder creation flag is determined at the time of a shooting, and a save destination folder is confirmed. If the save destination is a new folder, a folder is created at this point of time.

That is, according to the present invention, no folder is created before a shooting unlike in the conventional method in which a new folder is created when a save destination is designated. This prevents the unnecessary creation of empty folders. This also prevents the situation in which a created folder cannot be found at the time of a shooting. Furthermore, if the above temporarily set condition is stored in a nonvolatile memory or the like in advance, a folder can be created in accordance with the temporarily set condition even if the recording medium is replaced.

In the folder creation determination processing (FIG. 9), even if a save request to a new folder is issued upon generation of the above temporarily set request, the folder creation flag is cleared if it is determined that a new folder cannot be created. In this case, therefore, saving of an image into an existing folder is selected. For this reason, even in a case wherein a new folder cannot be created even if a save request to a new folder is issued, a shooting can be continued.

Even if no save request to a new folder is issued, a new folder is created by sequenced image creation determination processing (FIG. 111). That is, If it is determined that the predetermined number of image files guaranteed to be stored cannot be saved in the same existing folder, a folder creation flag is set to create a new folder. For this reason, even if no save request to a new folder is issued and a series of sequenced images cannot be saved in the same existing folder, a shooting can be continued, and a series of sequenced images can be saved in the same folder.

Further, as described above, according to the present invention, before a shooting, in file management processing (FIG. 7), latest shooting date and time as reference date and time are determined on the basis of at least one of the latest shooting date and time held in the image processing apparatus and the shooting date and time of the latest image file in a recording medium. By comparing the latest shooting date and time and the current time, the necessity to create a new folder is determined.

Since the latest shooting date and time are updated at the first image of sequenced images or in the case of a single shot shooting, even if a change of date and time as a new folder creation factor occurs during a sequenced image shooting, no new folder is created. That is, sequenced images are not saved in different destination folders. In addition, at the time of a sequenced image shooting, the latest shooting date and time are updated only at the first image. Therefore, when a change of date and time as a new folder creation factor occurs during the sequenced image shooting, a new folder is created at the time of a next shooting. Therefore, pickuped image file at the time of a next shooting do not exist together with image files obtained by the previous shooting in the same folder. This provides a useful effect in organizing image files.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application Nos. 2005-204739, 2005-204742 and 2005-204743, all, filed on Jul. 13, 2005, which are hereby incorporated by reference herein their entirety.

What is claimed is:

1. An image processing apparatus which records an image file obtained by a shooting into a folder in a recording medium, comprising:

a setting unit which sets a condition for creating a new folder;

a determination unit which determines whether or not a current shooting mode is sequenced images shooting; and a record control unit which controls a recording of image files into a folder of the recording medium, wherein:

in the case where the determination unit determines that the current shooting mode is not the sequenced images shooting mode, the record control unit records, when a shooting has been performed before the condition has been met, an obtained image file into an existing folder that had been set as a recording destination before the condition has been met, in the case where the determination unit determines that the current shooting mode is not the sequenced images shooting mode, the record control unit creates, when a shooting has been performed after the condition has been met, a new folder in the recording medium and then records an obtained image file into the new folder, and in the case where the determination unit determines that the current shooting mode is the sequenced images shooting mode and the condition has been met during a sequence of shootings being performed, the record control unit does not create a new folder and records a sequence of obtained image files, including image files that are obtained after the condition has been met, into the existing folder that had been set as a recording destination before the condition has been met.

2. The image processing apparatus according to claim 1, wherein the sequenced images shooting mode is preformed in a continuous shooting mode or in an auto bracketing mode.

3. The image processing apparatus according to claim 1, wherein the condition includes a condition that a new folder is created for every day or every month on which a shooting is performed.

4. The image processing apparatus according to claim 3, further comprising a storage unit which stores information on a latest shooting date and time, and wherein the record control unit further compares, when a shooting is performed, a current date and time with the stored latest shooting date and time, and determines that the condition has been met if the change of day or month that matches the condition has occurred from the latest shooting date.

5. The image processing apparatus according to claim 4, wherein in a case where the sequence shootings are performed in the sequenced images shooting mode, the storage unit stores date and time of a first shooting of the sequence shootings as the latest shooting date and time.

6. A non-transitory computer-readable recording medium on which a program that causes a computer to function as the image processing apparatus according to claim 1 when the program is executed by the computer.

7. A control method for an image processing apparatus which records an image file obtained by a shooting into a folder in a recording medium, comprising:

a setting step of setting a condition for creating a new folder;

a determination step of determining whether or not a current shooting mode is sequenced images shooting; and a record control step of controlling a recording of image files into a folder of the recording medium wherein:

in the case where the determination step determines that the current shooting mode is not the sequenced images shooting mode, the record control step records, when a shooting has performed before the condition has been met, an obtained image file into an existing folder that had been set as a recording destination before the condition has been met, in the case where the determination step determines that the current shooting mode is not the sequenced images shooting mode, the record control unit creates, when a shooting has been performed after the condition has been met, a new folder in the recording medium and then records an obtained image file into the new folder, and in the case where the determination step determines that the current shooting mode is the sequenced images shooting mode and the condition has been met during a sequence of shootings being performed, the record control unit does not create a new folder and records a sequence of obtained image files, including image files that are obtained after the condition has been met, into the existing folder that had been set as a recording destination before the condition has been met.

8. The control method according to claim 7, wherein the sequenced images shooting mode is preformed in a continuous shooting mode or in an auto bracketing mode.

9. The control method according to claim 7, wherein the condition includes a condition that a new folder is created for every day or every month on which a shooting is performed.

10. The control method according to claim 9, further comprising a storage step of storing information on a latest shooting date and time into a storage unit, and wherein the record control step further compares, when a shooting is performed, a current date and time with the stored latest shooting date and time, and determines that the condition has been met if the change of day or month that matches the condition has occurred from the latest shooting date.

11. The control method according to claim 10, wherein in a case where the sequence shootings are performed in the sequence images shooting mode, the storage step stores date and time of a first shooting of the sequence of shootings as the latest shooting date and time.

* * * * *